(12) United States Patent
Futaki et al.

(10) Patent No.: US 10,869,350 B2
(45) Date of Patent: Dec. 15, 2020

(54) ESTABLISHING SIMULTANEOUS RADIO CONNECTION BETWEEN A USER EQUIPMENT AND TWO ENODEBS

(71) Applicant: NEC Corporation, Tokyo (JP)

(72) Inventors: Hisashi Futaki, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/506,268

(22) Filed: Jul. 9, 2019

(65) Prior Publication Data

US 2019/0387563 A1 Dec. 19, 2019

Related U.S. Application Data

(63) Continuation of application No. 15/449,606, filed on Mar. 3, 2017, now Pat. No. 10,448,445, which is a (Continued)

(30) Foreign Application Priority Data

Oct. 5, 2012 (JP) ................. 2012-223177

(51) Int. Cl.
*H04B 7/00* (2006.01)
*H04W 76/15* (2018.01)
(Continued)

(52) U.S. Cl.
CPC ............ *H04W 76/15* (2018.02); *H04B 7/024* (2013.01); *H04L 5/0032* (2013.01); (Continued)

(58) Field of Classification Search
CPC ............. H04W 76/025; H04W 72/042; H04W 72/0426; H04W 72/0406
(Continued)

(56) References Cited

U.S. PATENT DOCUMENTS 8,498,666 B2 * 7/2013 Sebire .................... H04L 5/001
455/552.1
9,106,380 B2 * 8/2015 Baldemair ............. H04L 5/001
(Continued)

FOREIGN PATENT DOCUMENTS

WO WO-2011/040041 A1 4/2011
WO WO-2012/108399 A1 8/2012

OTHER PUBLICATIONS

3GPP RWS-120010 "Requirements, Candidate Solutions & Technology Roadmap for LTE Rel-12 Onward" (Jun. 11-12, 2012) (pp. 1-27).
(Continued)

*Primary Examiner* — Dmitry Levitan
(74) *Attorney, Agent, or Firm* — Wilmer Cutler Pickering Hale and Dorr LLP

(57) ABSTRACT

A first radio station (1) requests or instructs a second radio station (2) to prepare for communication with a radio terminal (3) on a second cell (20) while a first radio connection on a first cell (10) with the radio terminal (3) is established. Further, the first radio station (1) instructs the radio terminal (3) or the second radio station (2) to establish a second radio connection on the second cell (20) with the radio terminal (3) while maintaining the radio connection on the first cell (10) with the radio terminal (3). It is thus for example possible to enable a single radio terminal to establish radio connections with cells of a plurality of radio stations, in order to achieve carrier aggregation of cells operated by different radio stations.

10 Claims, 17 Drawing Sheets

Related U.S. Application Data continuation of application No. 14/432,167, filed as application No. PCT/JP2013/003739 on Jun. 14, 2013, now Pat. No. 9,743,448.

(51) Int. Cl.
| | | |
|---|---|---|
| *H04B 7/024* | (2017.01) | |
| *H04L 5/00* | (2006.01) | |
| *H04W 72/04* | (2009.01) | |

(52) U.S. Cl.
CPC ......... *H04L 5/0035* (2013.01); *H04W 72/042* (2013.01); *H04W 72/0426* (2013.01); *H04W 72/0406* (2013.01)

(58) Field of Classification Search
USPC ........................................ 370/310, 328, 329
See application file for complete search history.

(56) References Cited

U.S. PATENT DOCUMENTS

| | | | |
|---|---|---|---|
| 9,351,309 B1* | 5/2016 | Hinkle | H04W 72/087 |
| 9,380,611 B2* | 6/2016 | Lin | H04W 76/10 |
| 9,445,357 B2* | 9/2016 | Sawada | H04W 28/22 |
| 9,743,448 B2* | 8/2017 | Futaki | H04L 5/0035 |
| 10,448,445 B2* | 10/2019 | Futaki | H04L 5/0032 |
| 2011/0275359 A1 | 11/2011 | Sebire et al. | |
| 2012/0140743 A1 | 6/2012 | Pelletier et al. | |
| 2012/0163338 A1 | 6/2012 | Zhang et al. | |
| 2012/0294694 A1 | 11/2012 | Garot | |
| 2013/0021929 A1 | 1/2013 | Kim | |
| 2013/0176953 A1 | 7/2013 | Stern-Berkowitz et al. | |
| 2013/0215772 A1 | 8/2013 | Kaur et al. | |
| 2013/0223395 A1 | 8/2013 | Warken et al. | |
| 2013/0322389 A1 | 12/2013 | Maeda et al. | |
| 2014/0023016 A1 | 1/2014 | Mildh et al. | |
| 2014/0045507 A1 | 2/2014 | Bontu et al. | |
| 2014/0153504 A1* | 6/2014 | Wang | H04L 47/40 370/329 |
| 2014/0256311 A1 | 9/2014 | Muller et al. | |
| 2015/0003418 A1 | 1/2015 | Rosa et al. | |
| 2015/0016365 A1 | 1/2015 | Szufarska et al. | |
| 2015/0230236 A1 | 8/2015 | Zeng et al. | |
| 2015/0237514 A1 | 8/2015 | Maeda et al. | |
| 2016/0050652 A1* | 2/2016 | Wu | H04W 28/24 370/329 |
| 2016/0066364 A1 | 3/2016 | Marinier et al. | |
| 2017/0180091 A1* | 6/2017 | Futaki | H04W 72/0426 |

OTHER PUBLICATIONS

3GPP RWS-120046, "Technologies for Rel-12 and Onwards" (Jun. 11-12, 2012) (pp. 1-31).
3GPP TS 36.300 V11.3.0 (Sep. 2012) Technical Specification, 3rd Generation Partnership Project; technical Specfication Group Radio Access Network; Evolved Universal Terrestrial Radio Access (E-UTRA) and Evolved Universal Terrestrial Radio Acess Network (E-UTRAN); Overall Description; Stage 2 (Release 11), pp. 1-205 (Sep. 2012).
3GPP TS 36.331 V11.0.0—Protocol specification (Release 11) (Jun. 2012) (pp. 1-302).
3GPP TSG-RAN WG2#70 R2-102777 "eNB behaviour during inter-eNB HO with CA" (May 14, 2010) (2 pages).
Ericsson, "Addition of SRB and DRB radio bearer combinations to 36.508," 3GPP TSG-RAN WG5 Meeting #39bis, R5-082091, Agenda Item 2.2.7, Paris, France, Jun. 24-26, 2018 (9 pages).
Extended European Search Report issued by the European Patent Office for Application No. 13843531.8 dated Jun. 28, 2016 (9 pages).
Extended European Search Report issued by the European Patent Office for European Application No. 18183855.8 dated Sep. 11, 2018 (11 pages).
International Search Report corresponding to PCT/JP2013/003739 dated Jul. 30, 2013 (2 pages).
Korean Notice of Preliminary Rejection issued in Korean Patent Application No. 10-2015- 7008541, dated Apr. 14, 2017, 13 pages.
Korean Office Action issued by the Korean Intellectual Property Office for Korean Application No. 2018-7000403 dated Mar. 14, 2018 (9 pages).
Netmanias "LTE Identification III: EPS Session/Bearer Identifiers", Netmanias Technical Document: LTE Identififcation III: EPS Session/Bearer Identifiers, NMC Consulting Georup, www.nmcgroups.com, Aug. 26, 2013 (Intial Released: Feb. 9, 2011), 22 pages.
Nokia Siemens Networks, "Carrier Based ICIC for Inter-Site CA Optimization," 3GPP Draft, TSG-RAN WG3, Meeting #75, R3-120283, Agenda Item 12.1.2, Dresden, Germany, 5 pages (Feb. 6-10, 2011).
Notice of Allowance and Fee(s) Due issued in corresponding U.S. Appl. No. 14/432,167, dated Apr. 17, 2017, 13 pages.
Qualcomm Europe, "Open issues on EPS Bearer context management," 3GPP TSG CT WG1 Meeting #55, C1-083104, Budapest, Hungary, Aug. 18-22, 2008 (15 pages).
Rapporteur (Samsung), "Introduction of Carrier Aggregation," 3GPP TSG-RAn WG2 Meeting #71, R2-104516, Change Request, Madrid, Spain, Aug. 23-27, 2010 (73 pages).
Rapporteur (Samsung), "Introduction of Carrier Aggregation," 3GPP TSG-RAN WG2 Meeting #71, R2-104991, Change Request, Madrid, Spain, Aug. 23-27, 2010 (82 pages).
Korean Notice of Preliminary Rejection issued in Korean Patent Application No. 10-2019-7013666, dated Aug. 12, 2019, 13 pages.
Rapporteur (Samsung), "Introduction of Carrier Aggregation and UL/ DL MIMO", 3GPP TSG-RAN WG2 Meeting #72, R2-106856, Jacksonville, US, Nov 15-19, 2010, 88 pages.
Korean Notice of Allowance issued in Korean Patent Application No. 10-2019-7013666, dated Mar. 27, 2020, 3 pages.
Intel "Link Layer Aggregation Model for NB-IFOM", SA WG2 Temporary Document, SA WG2 Meeting #93, S2-123796 (revision of S2-12xxxx), Sofia, Bulgaria—Oct. 8-12, 2012, pp. 1-6.
USPTO Notice of Allowance and Fee(s) Due issued in U.S. Appl. No. 16/845,222, dated Jul. 1, 2020, 15 pages.

\* cited by examiner ated to a sharp recent increase in mobile traffic and to provide faster high-speed communication, the 3GPP LTE (Long Term Evolution) has examined standardization of the carrier aggregation (Carrier Aggregation: CA) function in which a radio base station (eNode B: eNB) communicates with a radio terminal (User Equipment: UE) using a plurality of cells. Note that, cells that a UE can use in CA are limited to cells of a single eNB (i.e., cells operated by a single eNB).

ESTABLISHING SIMULTANEOUS RADIO CONNECTION BETWEEN A USER EQUIPMENT AND TWO ENODEBS

CROSS REFERENCE TO RELATED APPLICATIONS

This application is a continuation of U.S. patent application Ser. No. 15/449,606 entitled "ESTABLISHING SIMULTANEOUS RADIO CONNECTION BETWEEN A USER EQUIPMENT AND TWO ENODEBS," filed Mar. 3, 2017, which is a continuation of U.S. patent application Ser. No. 14/432,167 entitled "Establishing Simultaneous Radio Connection Between A User Equipment And Two eNodeBs" filed Mar. 27, 2015 which is a national stage application of International Application No. PCT/JP2013/003739 entitled "Radio Communication System, Radio Station, Radio Terminal, Communication Control Method, and Computer Readable Medium," filed on Jun. 14, 2013 which claims the benefit of the priority of Japanese Patent Application No. 2012-223177, filed on Oct. 5, 2012, the disclosures of each of which are hereby incorporated by reference in their entirety.

TECHNICAL FIELD

The present invention relates to a radio communication system in which a radio station communicates with a radio terminal using a plurality of cells.

BACKGROUND

In order to address a reduction in communication quality attributed to a sharp recent increase in mobile traffic and to provide faster high-speed communication, the 3GPP LTE (Long Term Evolution) has examined standardization of the carrier aggregation (Carrier Aggregation: CA) function in which a radio base station (eNode B: eNB) communicates with a radio terminal (User Equipment: UE) using a plurality of cells. Note that, cells that a UE can use in CA are limited to cells of a single eNB (i.e., cells operated by a single eNB).

The CA procedure will be described with reference to FIG. 17 (Non Patent Literature 1). FIG. 17 shows an example in which a UE performs CA of a first cell (Cell1) and a second cell (Cell2) both operated by an eNB. In Step S1, the UE establishes a radio connection with the eNB on the first cell (RRC Connection Establishment). In Step S2, the UE receives downlink data from the eNB through the first cell (Downlink data on Cell1). Here, for the UE, the first cell is the primary cell (Primary cell: PCell).

In Step S3, the eNB determines that it is necessary to configure a secondary cell (Secondary cell: SCell) for the UE, and configures a second cell as the SCell through the PCell (RRC Connection Reconfiguration on Cell1 (including Configuration of Cell2 (Secondary cell: SCell)). In Step S4, the UE sends a completion notification to the eNB in response to completion of configuration of the second cell, that is, in response to completion of preparation of using the second cell (RRC Connection Reconfiguration Complete).

In Step S5, the eNB sends to the UE a notification of second cell use initiation (Cell2 Activation). In Step S6, the UE receives downlink data by simultaneously using the first and second cells (DL data on Cell1 and Cell2). Note that, the UE in Step S6 is just required to be capable of simultaneously using the first and second cells for downlink data reception. In other words, the UE is not required to constantly receive downlink data on both the first and second cells. Whether to use one of the first and second cells for downlink data reception or to use both of them is determined, for example, based on downlink data quantity or a service that the UE uses. The case where the UE transmits uplink data on the second cell can also be basically carried out by using a procedure similar to that shown in FIG. 17.

Though the UE that performs CA has functions of a Physical layer and at least part of a MAC (Medium Access Control) layer for each of the aggregated cells, the UE has the same structure of the RLC (Radio Link Control) and higher layers as in the case where CA is not performed. Accordingly, the core network (Evolved Packet Core: EPC) does not know whether or not the UE is performing CA.

Further, about a heterogeneous network (HetNet) environment, there is proposed a concept of Inter-eNB CA in which cells operated by different eNBs are aggregated (Non Patent Literature 2). For example, in Inter-eNB CA, it is considered to use a macro cell operated by a macro base station (Macro eNB: MeNB) and a pico cell operated by a pico base station (Pico eNB: PeNB).

Still further, there is also proposed a method in which a macro cell with wide coverage is used for transmission and reception of signals related to control such as UE mobility management, and a pico cell which has relatively good communication quality is used for transmission and reception of signals related to data such as user data (Non Patent Literature 3).

CITATION LIST

Non Patent Literature

[Non-Patent Literature 1] 3GPP TS 36.331 V11.0.0, "Evolved Universal Terrestrial Radio Access (E-UTRA); Radio Resource Control (RRC); Protocol specification", Section 5.3.5, July 2012
[Non-Patent Literature 2] 3GPP RWS-120046, Samsung Electronics, "Technologies for Rel-12 and Onwards", 3GPP TSG RAN Workshop on Rel-12 and Onwards Ljubljana, Slovenia, 11-12 Jun. 2012
[Non-Patent Literature 3] 3GPP RWS-120010, NTT DOCOMO, "Requirements, Candidate Solutions & Technology Roadmap for LTE Rel-12 Onward", 3GPP TSG RAN Workshop on Rel-12 and Onwards Ljubljana, Slovenia, 11-12 Jun. 2012

SUMMARY OF INVENTION

Technical Problem

In the conventional carrier aggregation (CA), since a radio terminal (UE) communicates through cells operated by a single radio station (eNB), the UE can configure the cells accordingly. Meanwhile, in carrier aggregation of cells operated by different eNBs (i.e., Inter-eNB CA), in order to simultaneously use the cells operated by different eNBs, the UE is required to perform cell configuration for performing communication (e.g., either or both of RRC Connection Setup and RRC Connection Reconfiguration) in each of the cells. Under the current LTE specification, however, when a UE has established a radio connection on a cell of one eNB, the UE cannot establish any radio connection on a cell of another eNB.

Accordingly, one object of the present invention is to provide a radio communication system, a radio station, a radio terminal, a communication control method, and a program which contribute to enabling a single radio terminal to establish radio connections with cells of a plurality of radio stations, in order to achieve carrier aggregation of cells operated by different radio stations.

Solution to Problem

In a first aspect, a radio communication system includes a first radio station that operates a first cell and a second radio station that operates a second cell. While a first radio connection on the first cell with a radio terminal is established, the first radio station requests or instructs the second radio station to prepare for communication with the radio terminal on the second cell. Further, the first radio station instructs the radio terminal or the second radio station to establish a second radio connection on the second cell between the second radio station and the radio terminal, while maintaining the first radio connection.

In a second aspect, a first radio station that operates a first cell includes a communication control unit that controls communication with a radio terminal having established a first radio connection on the first cell. While the first radio connection on the first cell with the radio terminal is established, the communication control unit requests or instructs a second radio station to prepare for communication with the radio terminal on the second cell. Further, the communication control unit instructs the radio terminal or the second radio station to establish a second radio connection on the second cell between the second radio station and the radio terminal, while maintaining the first radio connection.

In a third aspect, a second radio station that operates a second cell includes a communication control unit that controls communication with a radio terminal. While a first radio connection with the radio terminal is established on a first cell operated by a first radio station, the communication control unit prepares for communication with the radio terminal on the second cell in response to an instruction or a request from the first radio station. Further, the communication control unit establishes, in response to an instruction from the first radio station, a second radio connection on the second cell between the second radio station and the radio terminal while the first radio connection is maintained.

In a fourth aspect, a radio terminal includes a radio communication unit and a control unit. The control unit configures the second cell while maintaining the first radio connection with the first radio station, in response to an instruction from the first or second radio station according to the first, second, or third aspects.

In a fifth aspect, a communication control method in a first radio station that operates a first cell includes:

(a) requesting or instructing a second radio station, which operates a second cell, to prepare for communication with a radio terminal on the second cell, while a first radio connection on the first cell between the first radio station and the radio terminal is established; and (b) instructing the radio terminal or the second radio station to establish a second radio connection on the second cell with the radio terminal, while maintaining the first radio connection.

In a sixth aspect, a communication control method in a second radio station that operates a second cell includes:

(a) preparing for communication with a radio terminal on the second cell in response to an instruction or a request from a first radio station, while a first radio connection with the radio terminal on a first cell operated by the first radio station is established; and (b) establishing, in response to an instruction from the first radio station, a second radio connection on the second cell between the second radio station and the radio terminal while the first radio connection is maintained.

In a seventh aspect, a communication control method in a radio terminal includes configuring the second cell while maintaining the first radio connection with the first radio station, in response to an instruction from the first or second radio station according to the first, second or third aspects.

In an eighth aspect, a program includes instructions for causing a computer to perform the communication control method in the first radio station according to the fifth aspect.

In a ninth aspect, a program includes instructions for causing a computer to perform the communication control method in the second radio station according to the sixth aspect.

In a tenth aspect, a program includes instructions for causing a computer to perform the communication control method in the radio terminal according to the seventh aspect.

Advantageous Effects of Invention

According to the aspects described above, it is possible to provide a radio communication system, a radio station, a radio terminal, a communication control method, and a program which contribute to enabling a radio terminal to establish radio connections with cells of a plurality of radio stations, in order to achieve carrier aggregation of cells operated by different radio stations.

DESCRIPTION OF EMBODIMENTS

Hereinafter, specific embodiments will be explained in detail with reference to the drawings. The same or corresponding components are denoted by the same reference symbols throughout the drawings, and repetitive explanations will be omitted as necessary for the sake of clarity.

First Embodiment

Figure 1:
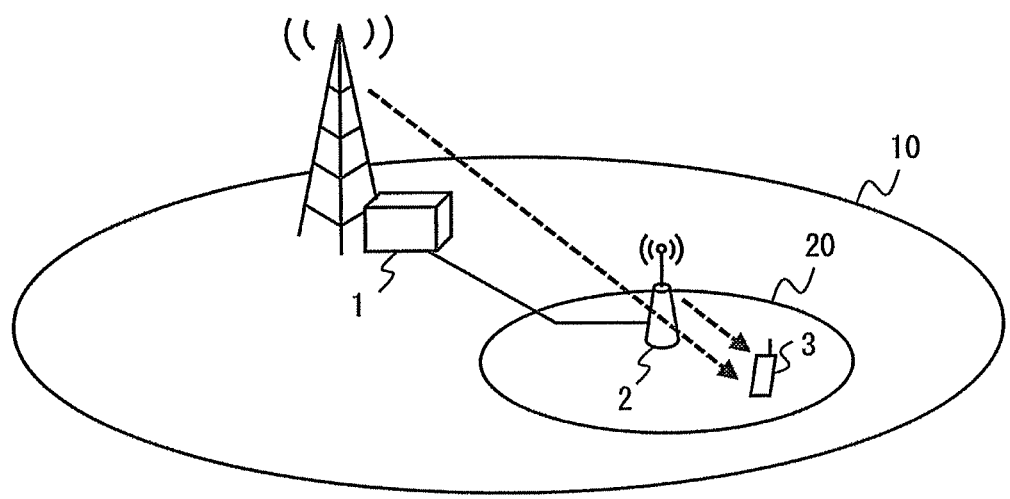
FIG. 1 is a diagram showing a configuration example of a radio communication system according to a first embodiment.

FIG. 1 shows a configuration example of a radio communication system according to the present embodiment. The radio communication system according to the present embodiment includes a first radio station 1, a second radio station 2, and a radio terminal 3. The radio stations 1 and 2 operate a first cell 10 and a second cell 20, respectively. The radio stations 1 and 2 are, for example, a radio base station or a base station controller. The radio terminal 3 is configured to establish a second radio connection on the second cell 20 while maintaining a first radio connection on the first cell 10. This allows the radio terminal 3 to simultaneously use a plurality of cells (e.g., the cells 10 and 20) for transmitting or receiving any signal (e.g., user data or control information). In other words, the radio terminal 3 supports carrier aggregation of cells operated by different radio stations.

Note that, FIG. 1 shows a HetNet environment. Specifically, the first cell 10 shown in FIG. 1 has a wider coverage area than the second cell 20 does. Further, FIG. 1 shows a hierarchical cell structure in which the second cell 20 is arranged in the first cell 10. However, the cell structure shown in FIG. 1 is merely an example. For example, the first and second cells 10 and 20 may have equivalent coverage areas. In other words, the radio communication system according to the present embodiment may be applied to a homogeneous network environment.

In order to enable the radio terminal 3 to simultaneously use the cells 10 and 20, which are operated by the different radio stations 1 and 2, for signal transmission or reception, the radio communication system of the present embodiment is required to establish a radio connection with the radio terminal 3 on each of the cell 10 and the cell 20. To this end, the radio communication system according to the present embodiment operates in the following manner. That is, in order to enable the radio terminal 3 to simultaneously use the cells 10 and 20 for signal transmission or reception, the radio station 1 is configured to request or instruct the radio station 2 to prepare for communication with the radio terminal 3 on the cell 20, while a first radio connection with the radio terminal 3 on the cell 10 is established. Further, the radio station 1 is configured to instruct the radio terminal 3 or the radio station 2 to establish a second radio connection on the cell 20 with the radio terminal 3, while maintaining the first radio connection. Thus, according to the present embodiment, the radio terminal 3 can establish a radio connection on each of the cells 10 and 20 for achieving carrier aggregation of the cells 10 and 20 operated by the different radio stations 1 and 2. Note that, the expression "to simultaneously use cells" is not limited to the manner of simultaneously receiving or transmitting signals actually on the cells. Instead, it includes the manner of receiving or transmitting signals actually on any one of the cells although the radio terminal 3 can receive or transmit signals on both of the cells, the manner of receiving or transmitting signals of different types on the respective cells, or the manner of using each of the cells for one of signal reception or transmission.

In a first exemplary procedure, the radio station 1 instructs the radio terminal 3 to establish the second radio connection on the cell 20. Then, the radio terminal 3 configures the cell 20 in response to the instruction from the radio station 1. Thus, the radio terminal 3 can establish the second radio connection with the radio station 2 on the cell 20. The radio station 1 may send the instruction to the radio terminal 3 via a control connection (e.g., a control channel, or a signaling radio bearer (Signaling Radio Bearer: SRB)) between the radio station 1 and the radio terminal 3 on the cell 10. Thus, the radio terminal 3 can easily prepare for communication on the cell 20 of the radio station 2 while communicating with the radio station 1 (i.e., while performing one or both of transmission and reception of signals carrying user data or the like).

In a second exemplary procedure, the radio station 1 instructs the radio station 2 to establish the second radio connection on the cell 20. The radio station 2 instructs the radio terminal 3 to establish the second radio connection on the cell 20 in response to the instruction from the radio station 1. Then, the radio terminal 3 configures the cell 20 in response to the instruction from the radio station 1. Thus, the radio terminal 3 can establish the second radio connection with the radio station 2 on the cell 20. Here, the second radio connection establishment instruction from the radio station 1 to the radio station 2 may be sent simultaneously with an instruction (or a request) to prepare for communication with the radio terminal 3 on the cell 20. Alternatively, the instruction (or the request) to prepare for the communication may double as the second radio connection establishment instruction. In other words, the message instructing or requesting to prepare for commutation on the cell 20 with the radio terminal 3 may explicitly or implicitly indicate the second radio connection establishment instruction from the radio station 1 to the radio station 2. That is, upon receiving the instruction (or a request) to prepare for communication with the radio terminal 3, the radio station 2 may prepare for the communication with the radio terminal 3 and also instruct the radio terminal 3 to establish the second radio connection. The instruction from the radio station 2 to the radio terminal 3 may be sent from the radio station 2 to the radio terminal 3 via a control connection (e.g., a control channel or a signaling radio bearer) between the radio station 1 and the radio terminal 3 on the cell 10. Further, in order to enable the radio terminal 3 to receive the instruction sent from the radio station 2, the radio station 1 may send, to the radio terminal 3 via a control connection on the cell 10, radio resource configuration information required for reception on the cell 20.

Note that, in the present specification, "establishing a radio connection" means, for example, that a radio terminal and a radio station become communicable with each other, or that a radio terminal and a radio station share information required for communication with each other. Further, "configuring a cell at a radio terminal" means, for example, that a cell becomes available at a radio terminal, or that a radio terminal completes preparation for using a cell. Still further, "preparing at a radio station for communication with a radio terminal" means, for example, that a radio station retains information required for a radio connection with a radio terminal, that a radio station generates information required for a radio connection with a radio terminal, that a radio station permits a radio connection with a radio terminal, or that a radio station is in a state ready to accept communication with a radio terminal.

In the first and second exemplary procedures described above, terminal individual information of the radio terminal 3 relating to establishment of the first or second radio connection may be sent from the radio station 1 to the radio station 2, or from the radio station 2 to the radio station 1. Further, in the first and second exemplary procedures, at least one of radio connection configuration information and radio access information relating to establishment of the first or second radio connection may be sent from the radio station 2 to the radio station 1, or from the radio station 1 to the radio station 2.

The terminal individual information of the radio terminal 3 relating to establishment of the first or second radio connection may include at least one of the information elements listed below:
  radio terminal capability information;
  radio terminal identifier information;
  selected network information;
  bearer information;
  radio resource control information;
  radio terminal mobility history information; and
  service information.

The radio connection configuration information relating to establishment of the first or second radio connection may include at least one of the information elements listed below:
  serving cell information;
  system information;
  radio resource configuration information;
  measurement configuration information;
  mobility control information; and
  security configuration information.

The radio access information relating to establishment of the first or second radio connection may include at least one of the information elements listed below:
  radio access identifier information; and
  radio access resource information.

The first and second exemplary procedures may be applied to various applications including, but not limited to, an application where the first radio station 1 is a radio station that operates (manages) a cell with relatively large coverage and the second radio station 2 is a low power radio station (Low Power Node: LPN) that operates (manages) a cell with small coverage. The LPN may be, for example, a radio station having similar functions as the radio station 1, or may be a new type network node (New Node) with reduced functions as compared with the radio station 1. Further, the second cell may be a new type cell (New Cell Type) being different from a conventional cell, i.e., the second cell may use a new type carrier (New Carrier Type) being different from a conventional carrier.

Figure 2:
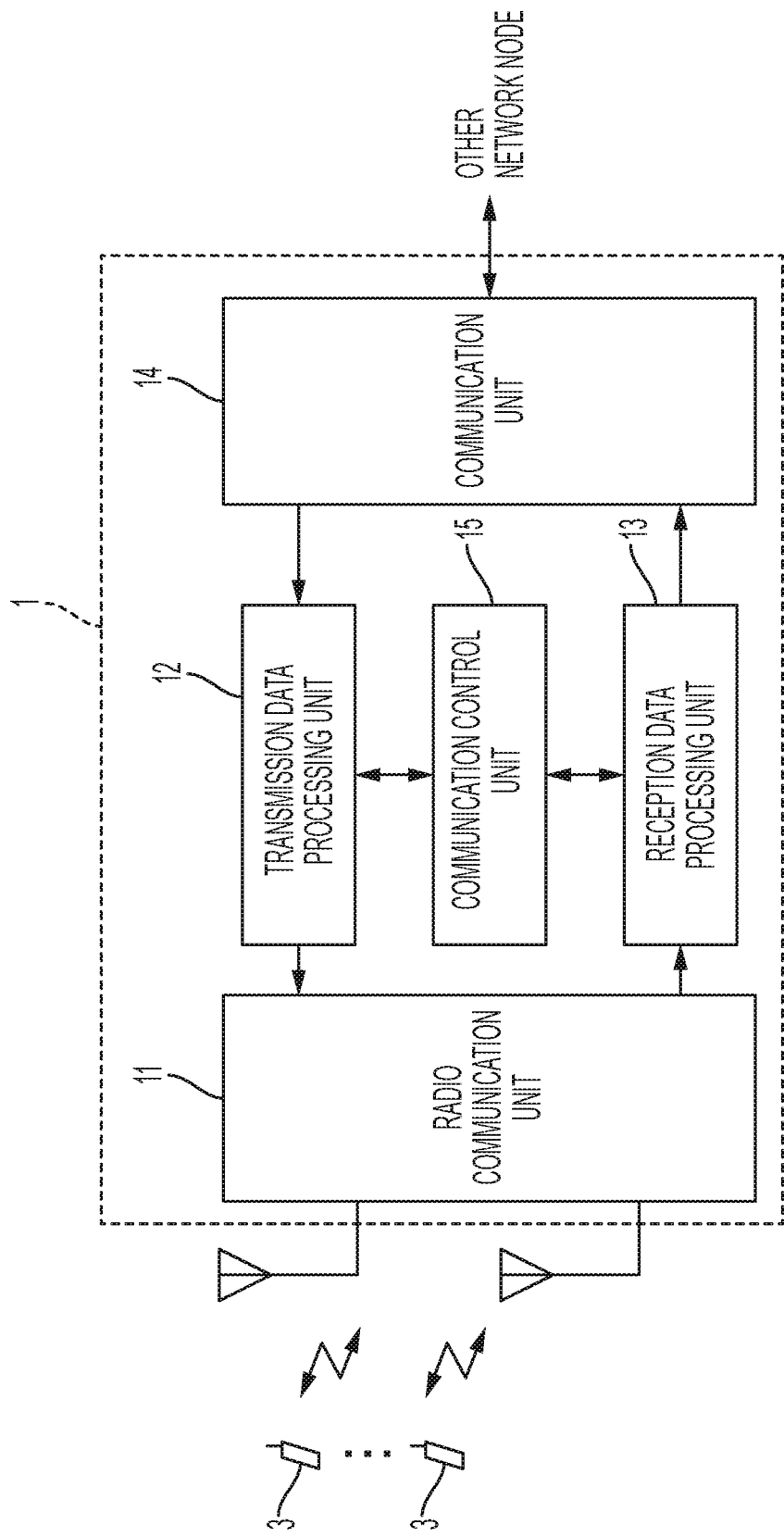
FIG. 2 is a diagram showing a configuration example of a first radio station according to the first embodiment.

In the following, configuration examples of the radio stations 1 and 2 and the radio terminal 3 according to the present embodiment will be described. FIG. 2 is a block diagram showing a configuration example of the first radio station 1. A radio communication unit 11 receives an uplink signal transmitted from the radio terminal 3 via an antenna. A reception data processing unit 13 reconstructs any received uplink signal. The obtained reception data is transferred to, via a communication unit 14, other network node, e.g., a data transferring apparatus or a mobility management apparatus in an upper network, or other radio station. For example, the uplink user data received from the radio terminal 3 is transferred to the data transferring apparatus in the upper network. Further, Non-Access-Stratum (NAS) control data out of the control data received from the radio terminal 3 is transferred to the mobility management apparatus in the upper network. Further, the reception data processing unit 13 receives, from a communication control unit 15, control data to be transmitted to the radio station 2, and sends the control data to the radio station 2 via the communication unit 14.

A transmission data processing unit 12 receives user data destined for the radio terminal 3 from the communication unit 14, and generates a transport channel by performing error-correction coding, rate matching, interleaving or the like. Further, the transmission data processing unit 12 adds control information to the data sequence of the transport channel to generate a transmission symbol sequence. The radio communication unit 11 performs processes such as carrier wave modulation based on the transmission symbol sequence, frequency conversion, signal amplification or the like to generate a downlink signal (downlink signal), and transmits the generated downlink signal to the radio terminal 3. Further, the transmission data processing unit 12 receives, from the communication control unit 15, control data to be transmitted to the radio terminal 3, and sends the received control data to the radio terminal 3 via the radio communication unit 11.

In order to enable the radio terminal 3 to simultaneously use the cells 10 and 20 for reception or transmission of user data, the communication control unit 15 exchanges signals with the radio station 2 and the radio terminal 3. That is, the communication control unit 15 sends, to the radio station 2 via the communication unit 14, a message requesting or instructing preparation for communication with the radio terminal 3 on the cell 20. Further, the communication control unit 15 sends a message instructing establishment of the second radio connection on the cell 20 to the radio terminal 3 or the radio station 2 via the radio communication unit 11 or the communication unit 14. Still further, in the case of the first exemplary procedure, the communication control unit 15 sends, to the radio terminal 3, the radio connection configuration information relating to the cell 20 operated by the radio station 2. The radio connection configuration information may be sent by the same message as an instruction for establishing a radio connection, or may be sent by a separate message. In the case of the second exemplary procedure, the communication control unit 15 may send, to the radio terminal 3, the radio resource configuration information relating to the cell 20 operated by the radio station 2.

Figure 3:
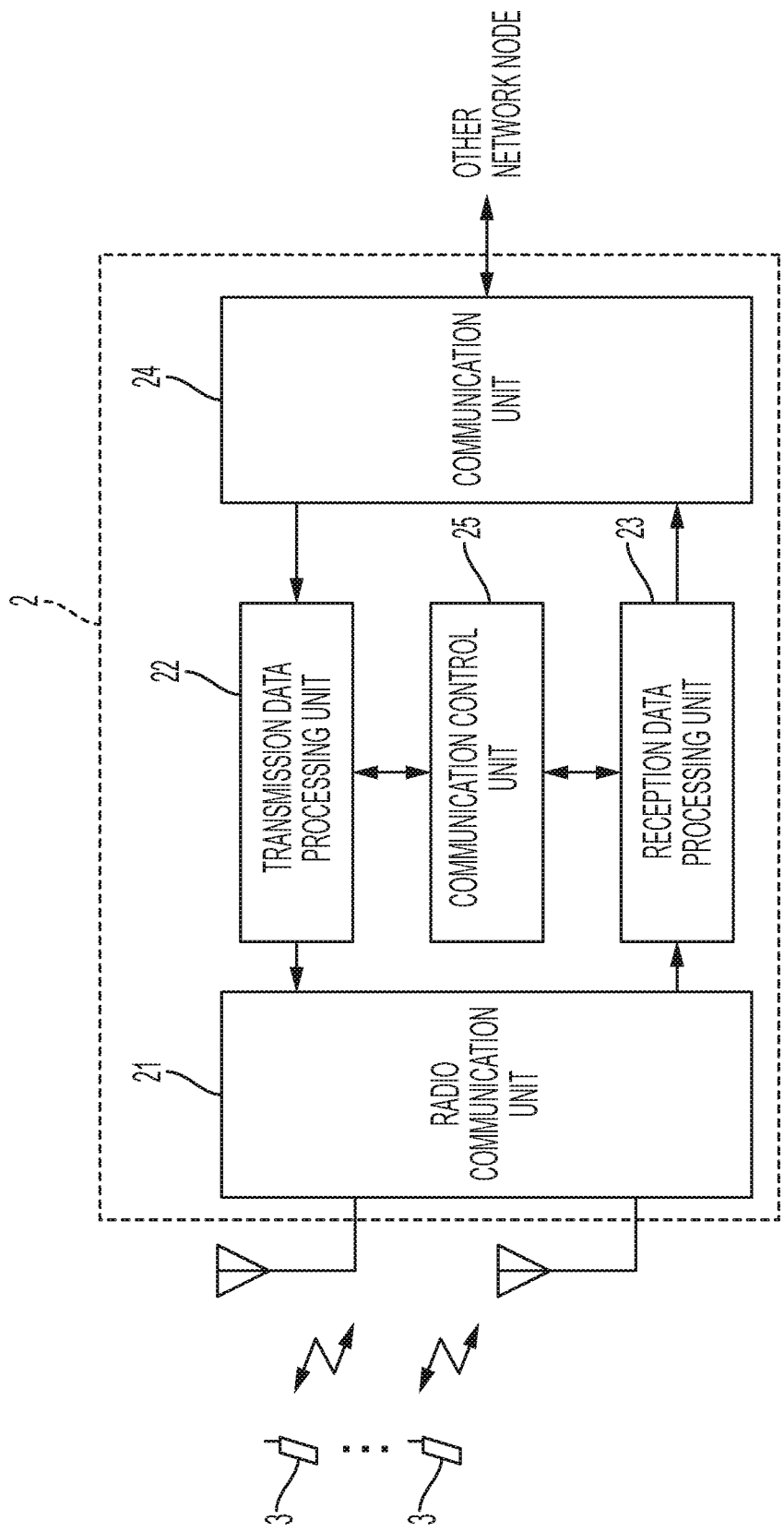
FIG. 3 is a diagram showing a configuration example of a second radio station according to the first embodiment.

FIG. 3 is a block diagram showing a configuration example of the second radio station 2. The functions and operations of a radio communication unit 21, a transmission data processing unit 22, a reception data processing unit 23, and a communication unit 24 shown in FIG. 3 are identical to those of the corresponding elements of the radio station 1 shown in FIG. 2, i.e., the radio communication unit 11, the transmission data processing unit 12, the reception data processing unit 13, and the communication unit 14.

The communication control unit 25 of the radio station 2 receives, from the radio station 1, a message requesting or instructing preparation for communication with the radio terminal 3 on the cell 20, and configures the radio communication unit 21 based on the message, thereby preparing for communication with the radio terminal 3 on the cell 20. In the case of the second exemplary procedure, the communication control unit 25 sends, to the radio terminal 3, radio connection configuration information relating to the cell 20 operated by the radio station 2. The radio connection configuration information may be sent by the same message as an instruction for establishing a radio connection or may be transmitted by a separate message.

Figure 4:
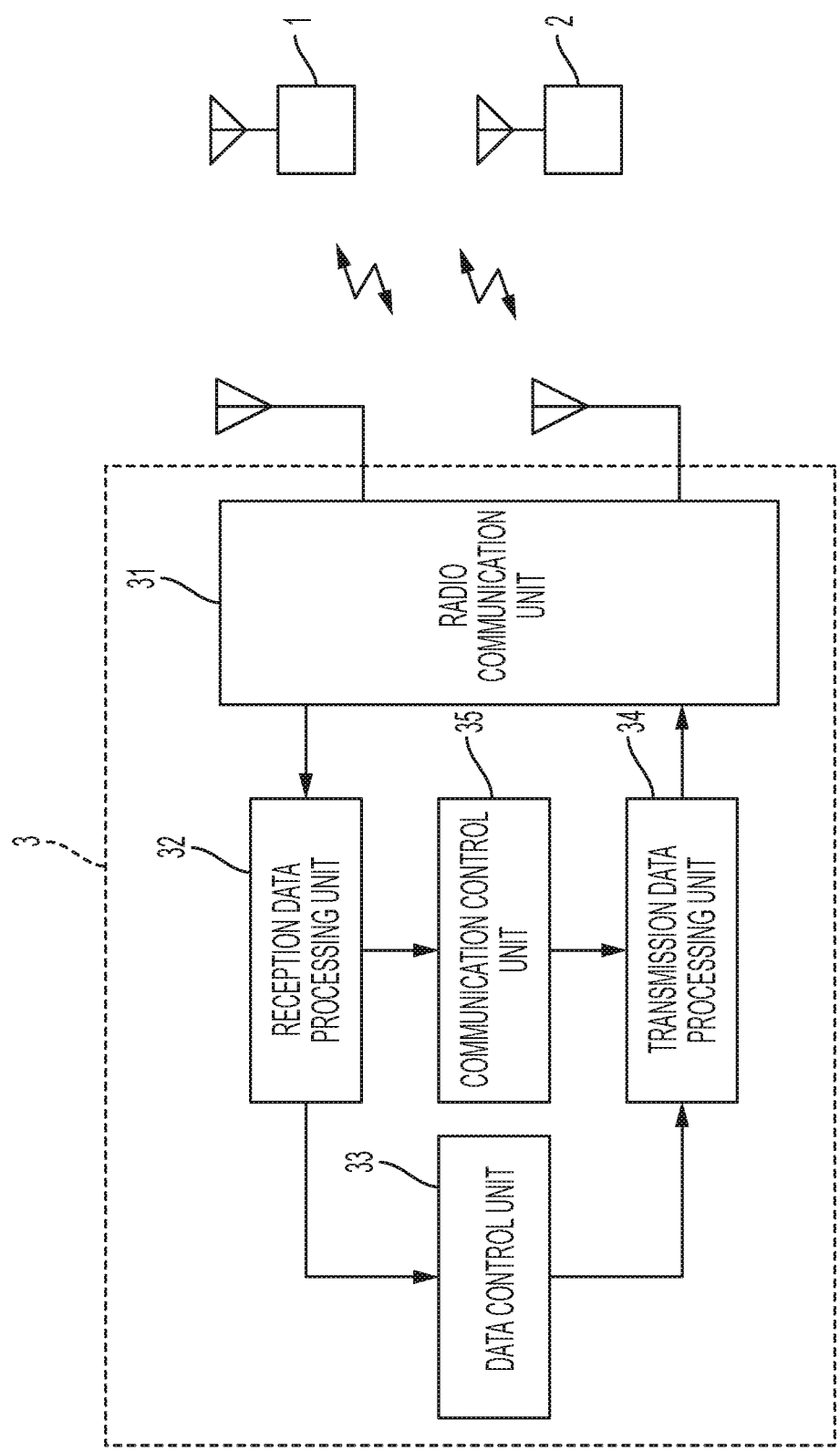
FIG. 4 is a diagram showing a configuration example of a radio terminal according to the first embodiment.

FIG. 4 is a block diagram showing a configuration example of the radio terminal 3. A radio communication unit 31 supports carrier aggregation of cells operated by different radio stations, and is capable of simultaneously using the cells (e.g., the cells 10 and 20) for signal transmission or reception. Specifically, the radio communication unit 31 receives downlink signals from one or both of the radio station 1 and the radio station 2 via an antenna. A reception data processing unit 32 reconstructs reception data from any received downlink signal and sends the reception data to a data control unit 33. The data control unit 33 uses the reception data according to the purpose thereof. A transmission data processing unit 34 and the radio communication unit 31 generate an uplink signal using transmission data supplied from the data control unit 33, and transmit the uplink signal to one or both of the radio stations 1 and the radio station 2.

In order to enable the radio communication unit 31 to simultaneously use the cells 10 and 20 to be simultaneously used at the radio communication unit 31, a communication control unit 35 of the radio terminal 3 configures the cell 20 in response to an instruction from the radio station 1 or the radio station 2. Thus, the radio terminal 3 can communicate with the radio station 2 also while communicating with the radio station 1 (i.e., while performing one or both of transmission and reception of signals carrying user data or the like).

In the following, a description will be given of examples of a procedure for establishing radio connections with the radio terminal 3 on both the cells 10 and 20 in order to enable the radio terminal 3 to simultaneously use the cells 10 and 20. Firstly, the first exemplary procedure will be described with reference to FIGS. 5 to 8, and thereafter the second exemplary procedure will be described with reference to FIGS. 9 to 12.

First Exemplary Procedure

Figure 5:
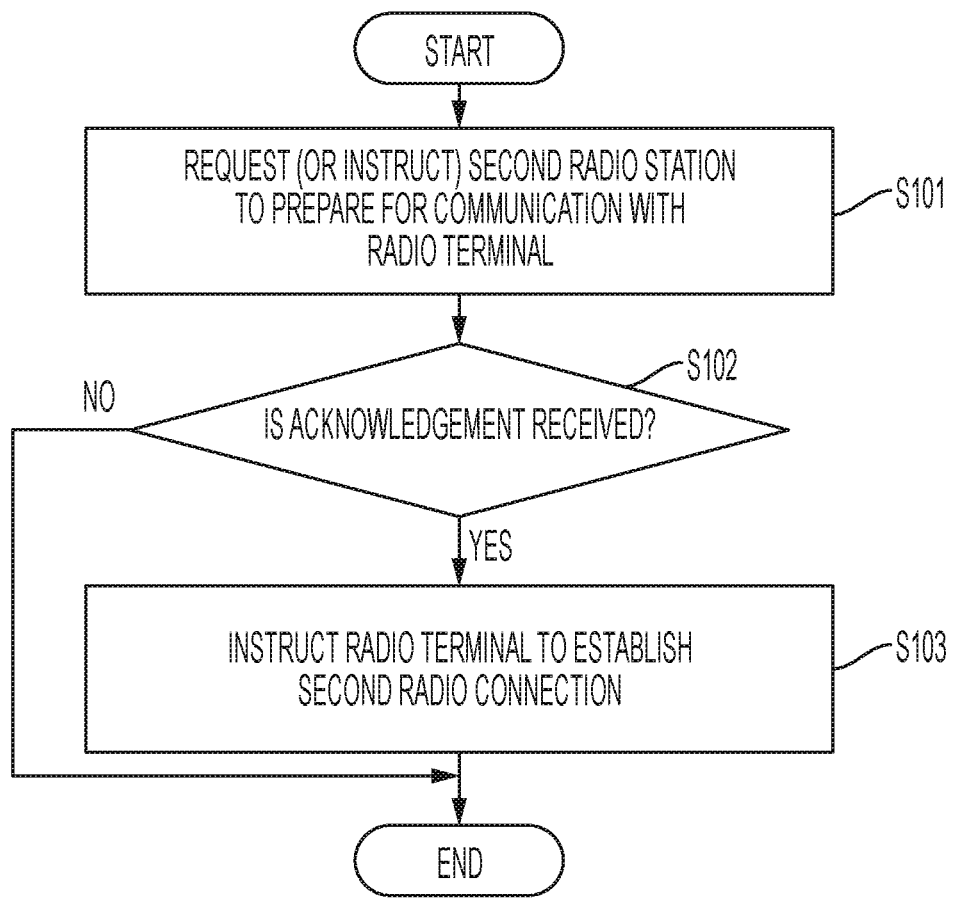
FIG. 5 is a flowchart showing an example of an operation of the first radio station according to the first embodiment (first exemplary procedure)

FIG. 5 is a flowchart showing an operation of the radio station 1 according to the first exemplary procedure. In Step S101, the radio station 1 (communication control unit 15) requests or instructs the radio station 2 to prepare for communication (i.e., one or both of transmission and reception of signals carrying user data or the like) on the cell 20 with the radio terminal 3 belonging to the its own cell 10. In Step S102, the radio station 1 determines whether an acknowledgement to the request or instruction in Step S101 has been received from the radio station 2. As has been described, in the first exemplary procedure, the radio station 1 directly instructs the radio terminal 3 to establish the second radio connection on the cell 20. Accordingly, when the acknowledgement has been received (YES in Step S102), the radio station 1 sends an instruction for establishing the second radio connection to the radio terminal 3 (Step S103). On the other hand, when no acknowledgement has been received (NO in Step S102), the radio station 1 does not instruct establishment of the second radio connection and ends the process shown in FIG. 5.

Figure 6:
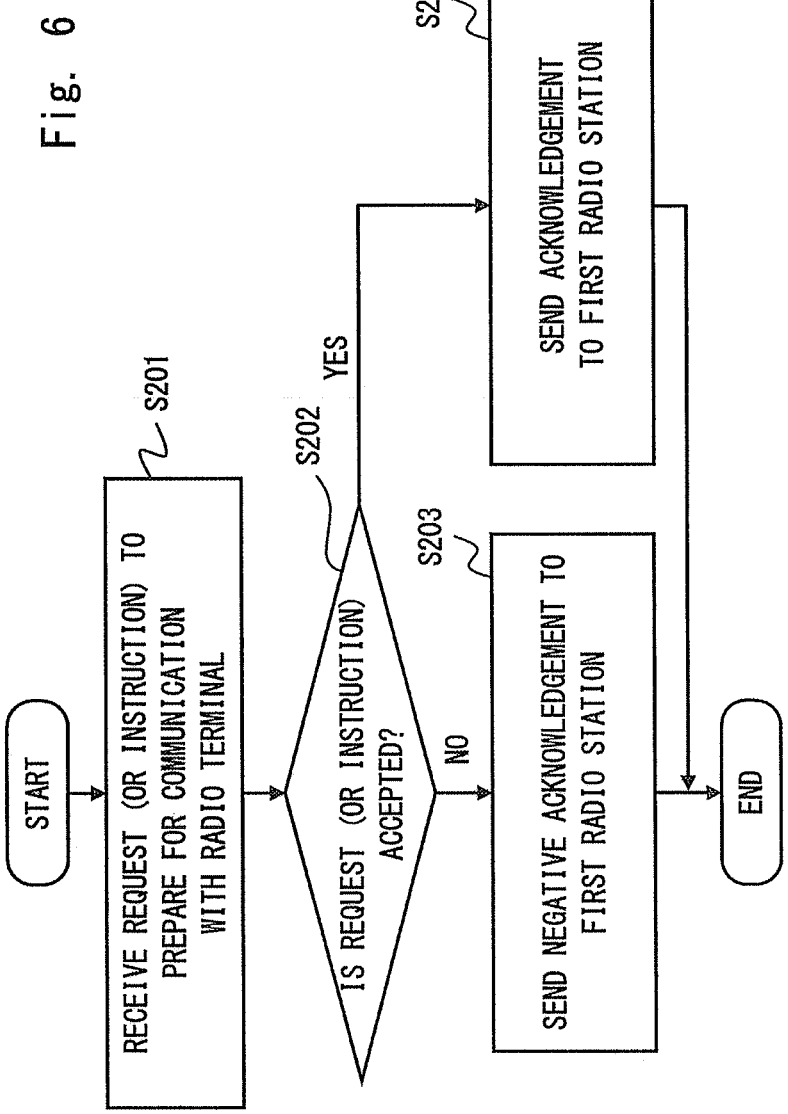
FIG. 6 is a flowchart showing an example of an operation of the second radio station according to the first embodiment (first exemplary procedure)

FIG. 6 is a flowchart showing an operation of the radio station 2 according to the first exemplary procedure. In Step S201, the radio station 2 (communication control unit 25) receives, from the radio station 1, a message instructing or requesting preparation for communication on the cell 20 with the radio terminal 3 belonging to the cell 10. In Step S202, the radio station 2 determines whether or not to accept the instruction or request from the radio station 1. For example, if the radio station 2 cannot prepare radio resource for communication with the radio terminal 3 because of high load of the cell 20, then the radio station 2 may reject the instruction or request from the radio station 1. The radio station 2 sends a negative acknowledgement to the radio station 1 when rejecting the instruction or request from the radio station 1 (Step S203), and sends an acknowledgement to the radio station 1 when accepting the instruction or request (Step S204). When the radio station 2 accepts the instruction or request from the radio station 1, the radio station 2 prepares for communication with the radio terminal 3 on the cell 20.

Figure 7:
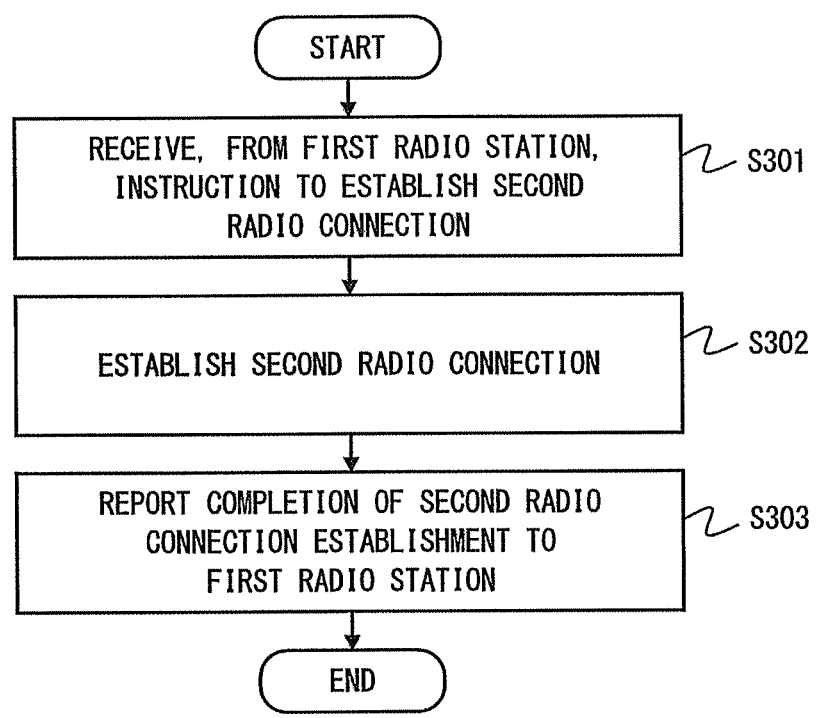
FIG. 7 is a flowchart showing an example of an operation of the radio terminal according to the first embodiment (first exemplary procedure)

FIG. 7 is a flowchart showing an operation of the radio terminal 3 according to the first exemplary procedure. In Step S301, the radio terminal 3 (communication control unit 35) receives an instruction for establishing the second radio connection from the first radio station 1. In Step S302, the radio terminal 3 configures the cell 20 in response to the instruction in Step S301, and establishes the second radio connection on the cell 20 with the radio station 2. In Step S303, the radio terminal 3 notifies the radio station 1 of completion of the second radio connection establishment on the cell 20.

Figure 8:
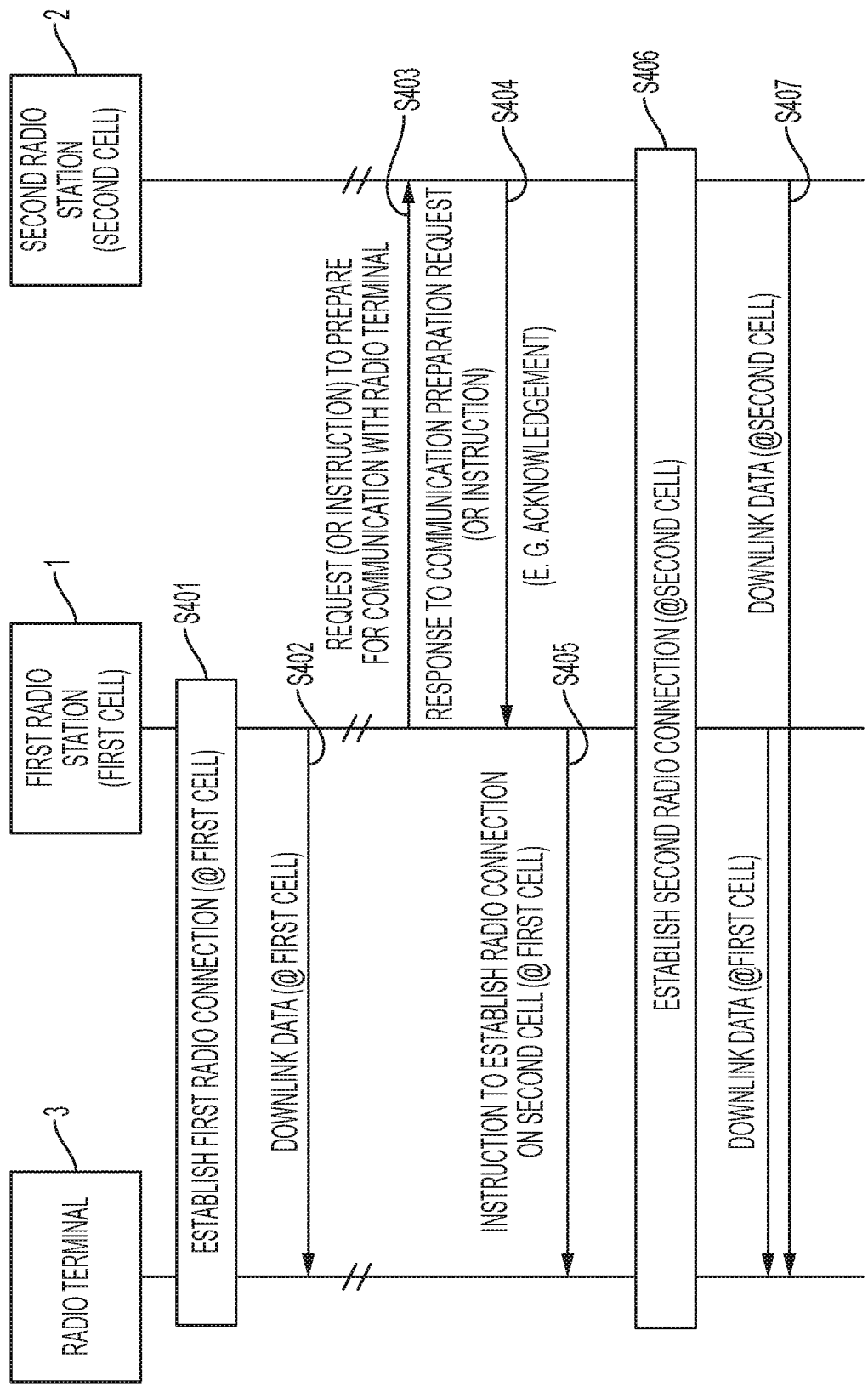
FIG. 8 is a sequence diagram showing an example of a communication control method in the radio communication system according to the first embodiment (first exemplary procedure)

FIG. 8 is a sequence diagram showing the entire first exemplary procedure. In Step S401, the first radio station 1 and the radio terminal 3 establish the first radio connection on the first cell 10. In Step S402, the radio station 1 communicates with the radio terminal 3 on the cell 10. In the example of FIG. 8, the radio station 1 transmits on the cell 10 downlink data destined for the radio terminal 3.

Steps S403 to S406 show a procedure for establishing the second radio connection on the cell 20 for the radio terminal 3, which is communicating on the cell 10. That is, in Step S403, the radio station 1 requests or instructs the radio station 2 to prepare for communication with the radio terminal 3 on the cell 20. In Step S404, the radio station 2 sends a response to the request or instruction in Step S403 to the radio station 1. The response is an acknowledgement or a negative acknowledgement. When sending an acknowledgement in Step S404, the radio station 2 prepares for communication with the radio terminal 3 on the cell 20 based on the request or instruction from the radio station 1. In Step S405, in response to receiving the acknowledgement, the radio station 1 sends, to the radio terminal 3 on the cell 10, an instruction for establishing the second radio connection on the cell 20. In Step S406, the radio terminal 3 configures the cell 20 based on the instruction from the radio station 1. Thus, the radio connection between the radio station 2 and the radio terminal 3 is established on the cell 20.

By completion of Step S406, the radio terminal 3 can simultaneously use the cells 10 and 20. Accordingly, in Step S407, for example, the radio terminal 3 receives downlink data at both of the cells 10 and 20. Note that, the radio terminal 3 in Step S407 is just required to be capable of simultaneously using the cells 10 and 20 for communication (performing one or both of reception and transmission of signals carrying user data or the like). In other words, the radio terminal 3 is not required to constantly receive downlink data or transmit uplink data at both of the first and second cells. Whether to use one of the cells 10 and 20 for user data reception or transmission or to use both of them is determined, for example, based on user data quantity or a service that the radio terminal 3 uses.

For example, when the radio station 2 is a radio station that has basic functions for communicating with the radio terminal 3, that is, when it is a radio station that can communicate with the radio terminal 3 on its own similarly to the radio station 1, the radio station 1 may send a request for communication preparation in Step S403 in FIG. 8. On the other hand, for example when the radio station 2 is a radio station that has (only) part of the functions for communicating with the radio terminal 3, the radio station 1 may send an instruction for communication preparation in Step S403. Here, a "request" and an "instruction" are differentiated as follows. A "Request" is used when a node receiving such a request determines whether or not to accept the request. Meanwhile, an "Instruction" is used when a node receiving such an instruction shall accept the instruction. Note that, a radio station that has (only) part of the functions for communicating with the radio terminal 3 is, for example, a radio station that transfers only user data between the radio terminal 3 and the upper network, or a radio station that only transfers control-related signals between the radio terminal 3 and the upper network. Alternatively, the radio station that has (only) part of the functions for communicating with the radio terminal 3 may be a radio station that has a function for communicating with the radio terminal 3 but lacks a function for communicating with the upper network.

In Step S403 in FIG. 8, when sending the request or instruction, the first radio station 1 may send the following information:
  radio connection configuration information: e.g., serving cell information;
  terminal individual information: e.g., radio terminal capability information, radio terminal identifier information, selected network identifier information, bearer information, radio resource control information, radio terminal mobility history information, service information, or any combination thereof; and
  radio access information: e.g., radio access identifier information.

Such information may be sent with the request or instruction (i.e., by the same message), or may be sent by a separate message.

In Step S404 in FIG. 8, when accepting the request or instruction from the radio station 1, the radio station 2 may send the following information:
  radio connection configuration information: e.g., system information, radio resource configuration information, measurement configuration information, mobility control information, security configuration information, or any combination thereof; and
  radio access information: e.g., radio access identifier information, radio access resource information, or the combination thereof.

Such information may be sent with a response to the request or instruction (i.e., by the same message), or may be sent by a separate message.

Second Exemplary Procedure

Figure 9:
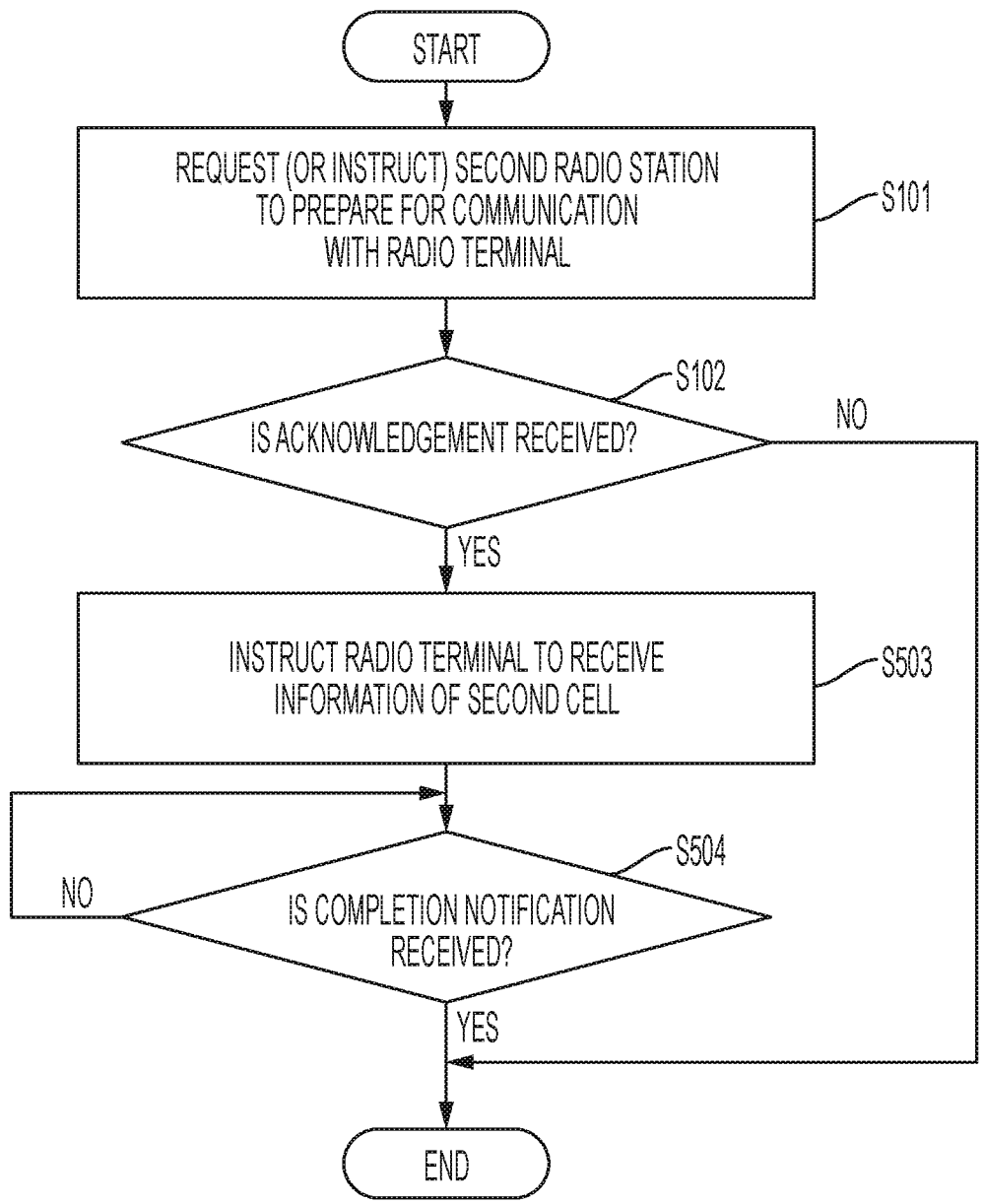
FIG. 9 is a flowchart showing an example of an operation of the first radio station according to the first embodiment (second exemplary procedure)

FIG. 9 is a flowchart showing an operation of the radio station 1 according to the second exemplary procedure. The processes in Steps S101 and S102 in FIG. 9 are similar to those in Steps S101 and S102 of the first exemplary procedure shown in FIG. 5. As has been described, in the second exemplary procedure, the radio station 1 instructs the radio station 2 to establish the second radio connection on the cell 20. The communication preparation instruction (or request) in Step S101 may double as the instruction from the radio station 1 to the radio station 2 to establish the second radio connection. The procedure shown in FIG. 9 represents the case where the communication preparation instruction in Step S101 doubles as the second radio connection establishment instruction. That is, the communication preparation instruction (or request) message in Step S101 explicitly or implicitly represents the second radio connection establishment instruction. Accordingly, in the example of FIG. 9, the radio station 1 is not required to send to the radio station 2 an independent message indicating the second radio connection establishment instruction. In Step S503, the radio station 1 (communication control unit 15) instructs, on the first cell 10, the radio terminal 3 to receive information of the second cell 20. In Step S504, the radio station 1 determines whether a notification of completion of the second radio connection establishment has been received from the radio station 2, and ends the procedure of FIG. 9 on condition that the completion notification has been received.

Figure 10:
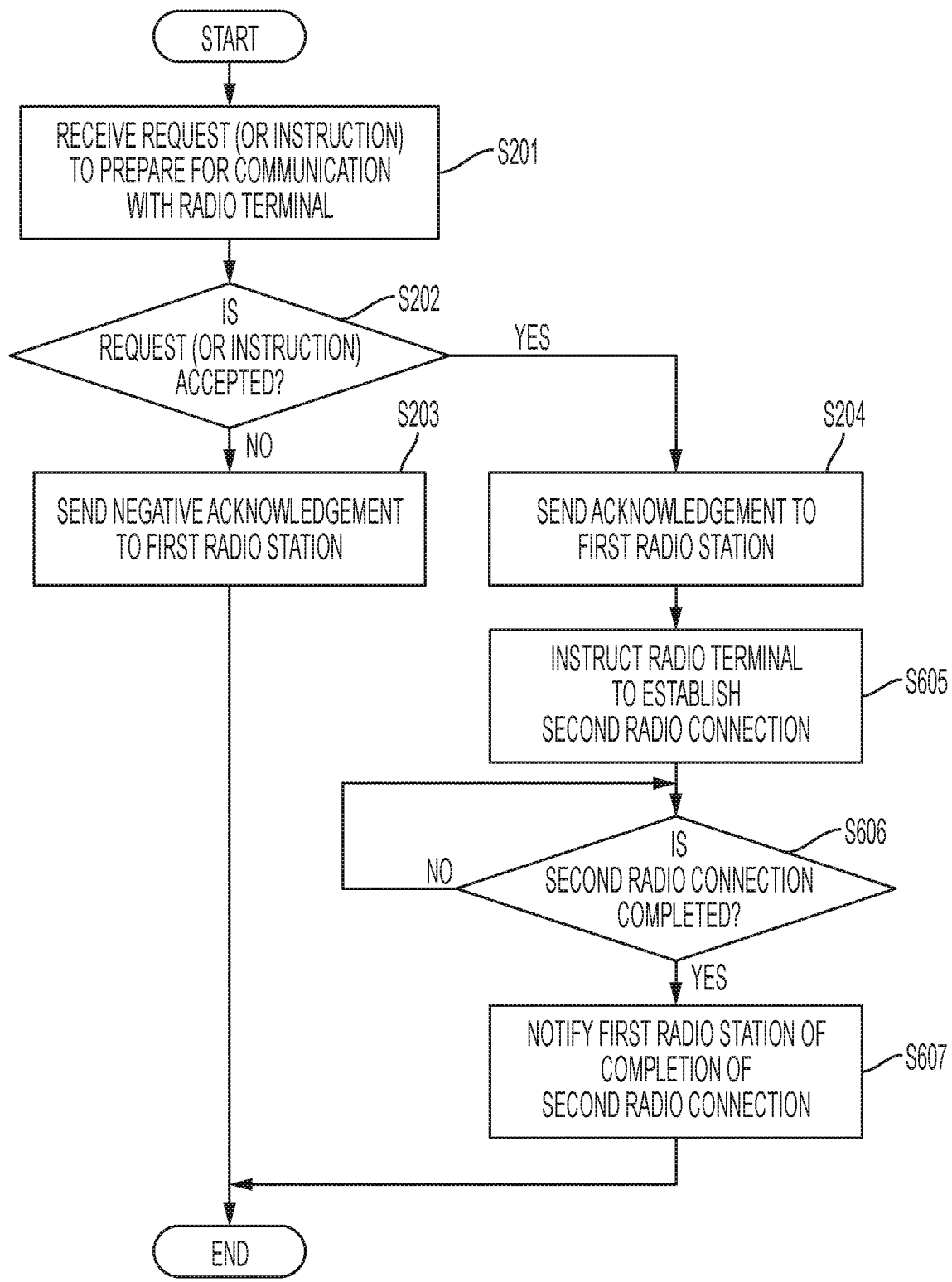
FIG. 10 is a flowchart showing an example of an operation of the second radio station according to the first embodiment (second exemplary procedure)

FIG. 10 is a flowchart showing an operation of the radio station 2 according to the second exemplary procedure. The processes in Steps S201 to S204 in FIG. 10 are similar to those in Steps S201 to S204 of the second exemplary procedure shown in FIG. 6. In Step S605, the radio station 2 (communication control unit 25) instructs the radio terminal 3 to establish the second radio connection on the cell 20. Then, the radio station 2 sends a completion notification to the radio station 1 in response to completion of the second radio connection establishment (Steps S606 and S607).

Figure 11:
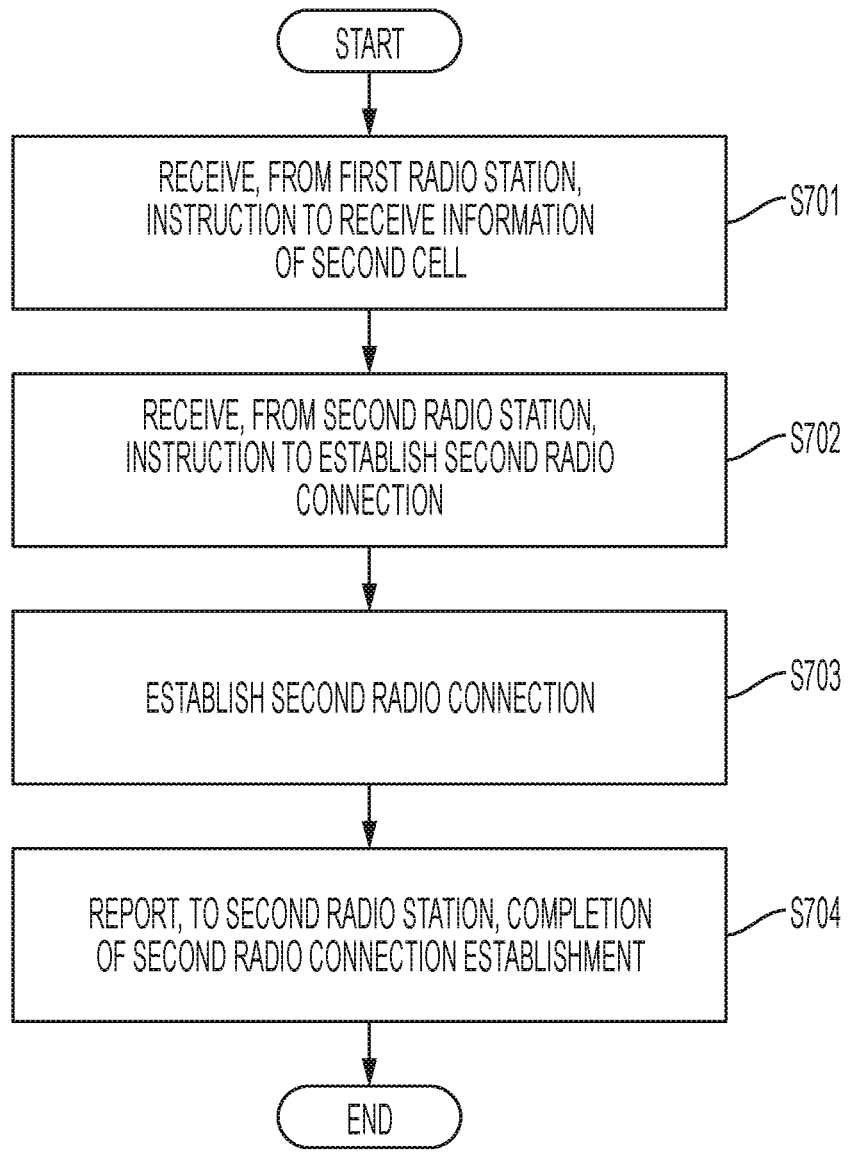
FIG. 11 is a flowchart showing an example of an operation of the radio terminal according to the first embodiment (second exemplary procedure)

FIG. 11 is a flowchart showing an operation of the radio terminal 3 according to the second exemplary procedure. In Step S701, the radio terminal 3 (communication control unit 35) receives, on the first cell 10 from the first radio station 1, an instruction to receive information of the second cell 20. The radio terminal 3 performs the operation of reception on the second cell 20, based on the instruction from the radio station 1. In Step S702, the radio terminal 3 receives, from the second radio station 2, an instruction to establish the second radio connection. In Step S703, in response to the instruction in Step S701, the radio terminal 3 configures the cell 20, and establishes the second radio connection with the radio station 2 on the cell 20. In Step S704, the radio terminal 3 reports, to the radio station 2, completion of second radio connection establishment on the cell 20.

Figure 12:
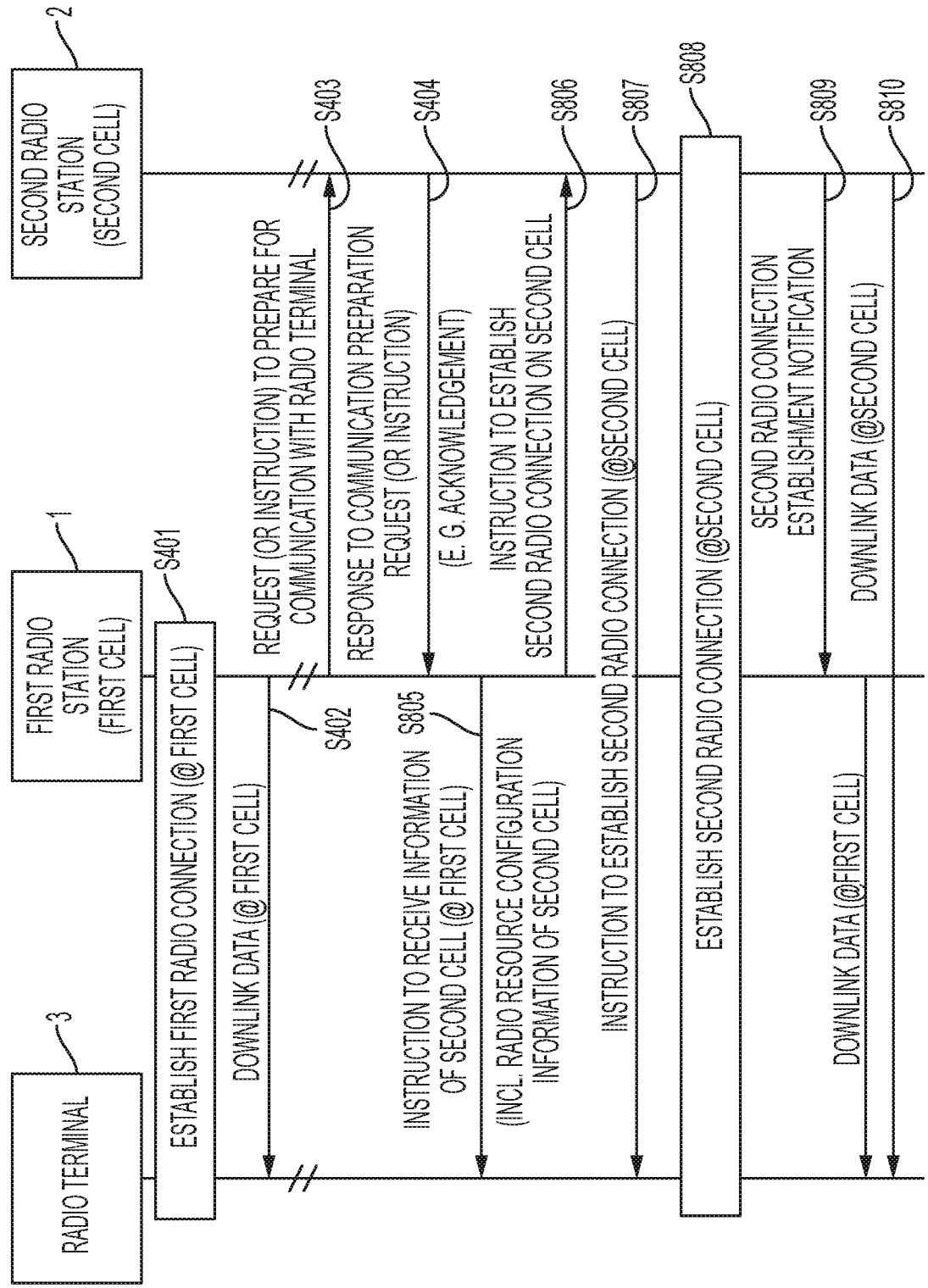
FIG. 12 is a sequence diagram showing an example of a communication control method in the radio communication system according to the first embodiment (second exemplary procedure)

FIG. 12 is a sequence diagram showing the entire second exemplary procedure. The processes in Steps S401 to S404 in FIG. 12 are similar to Steps S401 to S404 of the first exemplary procedure shown in FIG. 8. In Step S805, the radio station 1 instructs, on the first cell 10, the radio terminal 3 to receive information of the second cell 20. The instruction in Step S805 includes radio resource configuration information of the second cell 20 that is necessary for the radio terminal 2 to perform the reception operation on the second cell 20. In Step S805, the radio station 1 may also sends information that defines a gap period (e.g., gap pattern) for the radio terminal 3 to perform the reception operation on the cell 20. Alternatively, in the case where a gap period is previously defined, the radio terminal 3 may spontaneously set a gap period, in response to reception of the radio resource configuration information of the second cell 20 from the radio station 1. Here, the gap period means the period during which, for reception of information on the second cell 20, transmission on the first cell 10 to the radio terminal 3 is stopped or the radio terminal 3 is not required to receive any signal destined for the radio terminal 3 on the first cell.

In Step S806, the radio station 1 instructs the radio station 2 to establish the second radio connection on the cell 20 with the radio terminal 3. As has been described, the instruction in Step S806 may not be given explicitly. In Step S807, the radio station 2 instructs the radio terminal 3 to establish the second radio connection on the cell 20. In Step S808, the radio terminal 3 configures the cell 20 based on the instruction from the radio station 2. Thus, the radio connection between the radio station 2 and the radio terminal 3 is established on the cell 20. In Step S809, the radio station 2 notifies the radio station 1 of completion of second radio connection establishment. By the completion in Step S808, the radio terminal 3 can simultaneously use the cells 10 and 20. Accordingly, in Step S810, for example, the radio terminal 3 receives downlink data at each of the cells 10 and 20.

Second Embodiment

In the present embodiment, an example in which the first embodiment is applied to a 3GPP LTE system will be described. A configuration example of the radio communication system according to the present embodiment may be similar to that shown in FIG. 1. Note that, the radio stations 1 and 2 correspond to eNBs, and the radio terminal 3 corresponds to a UE. The information exchange between radio stations (i.e., between eNBs) may be performed using X2 as a direct interface, may be performed using S1 as an interface via the core network, or may be performed using a newly defined interface (e.g., X3). The radio terminal (UE) 3 supports carrier aggregation of cells operated by different radio stations (eNBs) (Inter-eNB CA). Note that, the "Inter-eNB CA" as used herein is not limited to the manner of simultaneously receiving or transmitting signals actually on cells of different eNBs. Instead, it includes the manner of receiving or transmitting signals (e.g., user data or control information) actually on any one of cells of different eNBs although the UE 3 can receive or transmit signals on both of the cells of the different eNBs, the manner of receiving or transmitting signals of different types on respective cells of different eNBs, or the manner of using each of cells of different eNBs for one of signal reception and transmission. In the following, a description will be given regarding the radio stations 1 and 2 as an eNB 1 and an eNB 2, and the radio terminal 3 as a UE 3.

In the present embodiment, a procedure for establishing a radio connection between each of the cells 10 and 20 and the UE 3 may be similar to that according to the first embodiment. That is, the eNB 1 requests or instructs the eNB 2 to prepare for communication with the UE 3 on the cell 20, while the first radio connection on the cell 10 with the UE 3 is established. Further, while maintaining the first radio connection, the eNB 1 instructs the UE 3 or the eNB 2 to establish the second radio connection with the UE 3 on the cell 20. In instructing the eNB 2 to establish the second radio connection, the instruction to the eNB 2 may be given implicitly. Thus, according to the present embodiment, the UE 3 can establish a radio connection on each of the cells 10 and 20 for performing carrier aggregation of the cells 10 and 20 operated by different eNBs 1 and 2.

Here, which one of the eNBs 1 and 2 is to be used for downlink user data transmission may be determined, for example, based on the type of service or required QoS (or QCI). Further, control-related signals (Control Plane (CP) signal) may be transmitted from the eNB 1 while user data-related signals (User Plane (UP) signal) may be transmitted from the eNB 2.

A third exemplary procedure corresponds to the first exemplary procedure according to the first embodiment. In the third exemplary procedure, the eNB 1 instructs the UE 3 to establish the second radio connection on the cell 20. In this case, the eNB 1 may notify the UE 3 of radio connection configuration information (RRC Connection Reconfiguration information) relating to the radio connection on the cell 20. Then, the UE 3 configures the cell 20 in response to the instruction from the eNB 1. Thus, the UE 3 can establish the second radio connection on the cell 20 with the eNB 2.

A fourth exemplary procedure corresponds to the first exemplary procedure according to the second embodiment. In the fourth exemplary procedure, the eNB 1 instructs the eNB 2 to establish the second radio connection on the cell 20. In response to the instruction from the eNB 1, the eNB 2 instructs the UE 3 to establish the second radio connection on the cell 20. The eNB 2 may notify the UE 3 of the radio connection configuration information (RRC Connection Reconfiguration information) relating to the radio connection on the cell 20. Then, the UE 3 configures the cell 20 in response to the instruction from the eNB 2. Thus, the UE 3 can establish the second radio connection on the cell 20 with the eNB 2.

In the third and fourth exemplary procedures, it is also possible that at least part of terminal individual information (UE Context information) of the UE 3 relating to establishment of the second radio connection is sent from the eNB 1 to the eNB 2 or from the eNB 2 to the eNB 1. Further, in the third and fourth exemplary procedures, at least one of radio connection configuration information (RRC Connection Reconfiguration information) and radio access information (Radio Access information) relating to establishment of the first or second radio connection may be sent from the eNB 2 to the eNB 1 or from the eNB 1 to the eNB 2.

The terminal individual information (UE Context information) may include at least one of the information elements listed below:

radio terminal capability information (UE capability information): e.g., UE radio access capability, UE network capability, UE security capability, or any combination thereof;

radio terminal identifier information (UE identification information): e.g., C-RNTI, (S-)TMSI, shortMAC-I, or any combination thereof;

selected network information (UE selected network information): e.g., GUMMEI (Globally Unique MME Identifier), eNB UE S1 AP ID, MME UE S1 AP ID, CSG ID, or any combination thereof;

bearer information (Bearer information): e.g., E-RAB ID, E-RAB Level QoS Parameters, UL GTP Tunnel Endpoint ID, or any combination thereof;

radio resource control information (RRC context information): AS-Config, AS-Context, ue-ConfigRelease, ue-RadioAccessCapabilityInfo, or any combination thereof;

radio terminal mobility history information (UE history information): e.g., Last Visited Cell Information; and service information (Service information): e.g., QCI, QoS, MBMS information, or any combination thereof.

The radio connection configuration information (RRC Connection Reconfiguration information) may include at least one of the information elements listed below:

serving cell information (Serving Cell information): e.g., Physical Cell ID (PCI), EUTRAN Cell Global ID (ECGI), or the combination thereof;

system information (System information): e.g., MIB (Master Information Block), SIB (System Information Block)×(x=1, 2, . . . ), or the combination thereof;

radio resource configuration information (Radio resource configuration information): e.g., PhysicalConfigDedicated, Mac-Mainconfig, RLC-Config, PDCP-Config, logicalChannelIdentity, drb-Identity, eps-BearerIdentity, or any combination thereof;

measurement configuration information (Measurement configuration information): e.g., MeasObject, ReportConfig, or the combination thereof;

mobility control information (Mobility control information): e.g., targetPhysCellId, carrierFreq, newUE-Identity, or any combination thereof; and security configuration information (Security configuration information): e.g., SecurityAlgorithmConfig.

The radio access information (Radio Access information) may include at least one of the information elements listed below:

radio access identifier information (Radio access identification information): e.g., RACH preamble index; and radio access resource information (Radio access resource information): e.g., PRACH resource configuration.

The third and fourth exemplary procedures may be applied to various applications including, but not limited to, an application where the eNB 1 is a macro radio base station (Macro eNB: MeNB) that operates (manages) a macro cell with relatively large coverage and the eNB 2 is a low power radio station (Low Power Node: LPN) that operates (manages) a cell with small coverage. The LPN may be, for example, a pico radio base station (Pico eNB: PeNB) having similar functions as the MeNB, or may be a new type network node (New Node) with reduced functions as compared with the MeNB. Further, the second cell (cell 20) may be a new type cell (New Cell Type) being different from a conventional cell, i.e., the second cell may use a new type carrier (New Carrier Type) being different from a conventional carrier.

Figure 13:
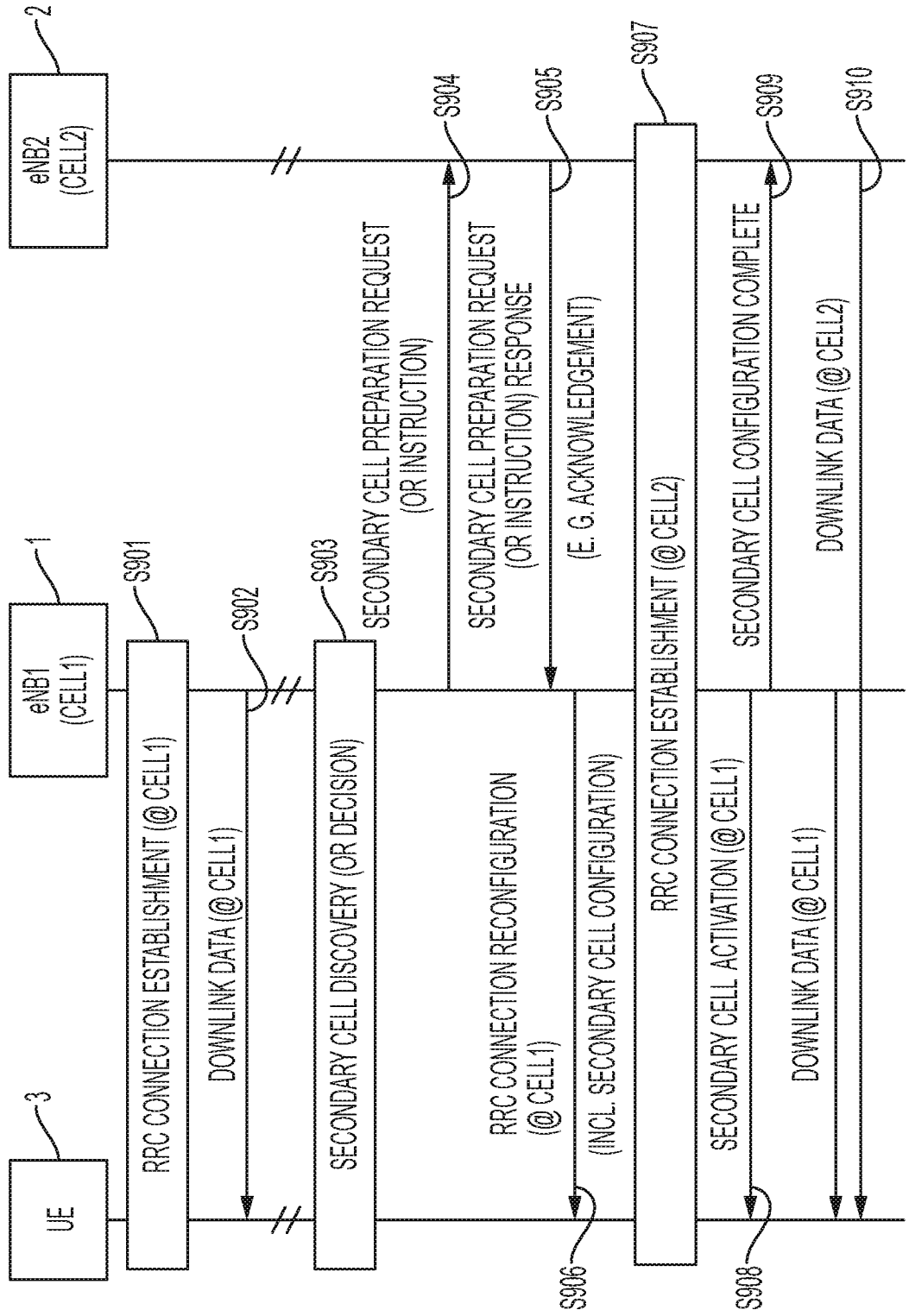
FIG. 13 is a sequence diagram showing an example of a communication control method in a radio communication system according to a second embodiment (third exemplary procedure)
Figure 14:
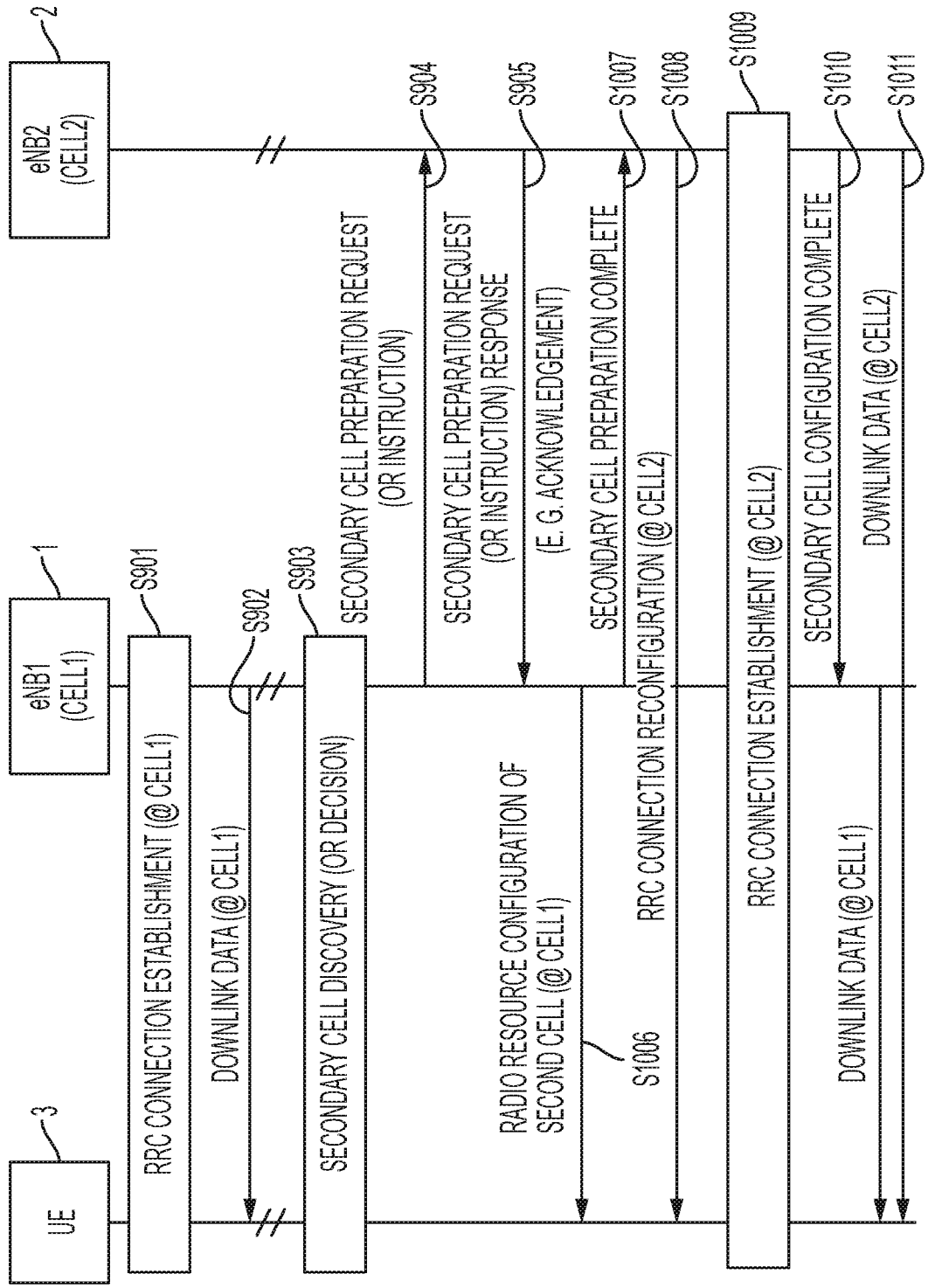
FIG. 14 is a sequence diagram showing an example of a communication control method in the radio communication system according to the second embodiment (fourth exemplary procedure)

In the following, specific examples of the third and fourth exemplary procedures will be described. FIG. 13 is a sequence diagram showing the entire third exemplary procedure, and FIG. 14 is a sequence diagram showing the entire fourth exemplary procedure. Note that, in FIGS. 13 and 14, the first cell 10 is referred to as CELL1, and the second cell 20 is referred to as CELL2.

Third Exemplary Procedure

In Step S901, the eNB 1 and the UE 3 establish, on the cell 10, the first radio connection (RRC Connection Establishment). In Step S902, the eNB 1 communicates with the UE 3 on the cell 10. In the example of FIG. 13, the eNB 1 transmits, on the cell 10, downlink data destined for the UE 3. In Step S903, the UE 3 or the eNB 1 performs detection or decision of the cell 20 (secondary cell discovery or decision). In Step S904, the eNB 1 requests or instructs the eNB 2, which operates the cell 20, to prepare for communication (i.e., one or both of transmission and reception of signals carrying user data or the like) on the cell 20 with the UE 3, which belongs to the its own cell (serving cell) 10 (Secondary Cell Preparation Request (or instruction)). In Step S905, the eNB 2 sends a response to the request or instruction in Step S904 to the eNB 1 (Secondary Cell Preparation Request (or instruction) response). When an acknowledgement (Acknowledgement) is transmitted in Step S905, the eNB 2 prepares for communication with the UE 3 on the cell 20, based on the request or instruction from the eNB 1.

In Step S906, in response to reception of the acknowledgement, the eNB 1 sends, to the UE 3 on the cell 10, an instruction for establishing the second radio connection on the cell 20 (RRC Connection Reconfiguration). The instruction includes radio connection configuration information of the second cell 20 (Secondary Cell configuration). In Step S907, the UE 3 configures the cell 20 based on the instruction from the eNB 1. Thus, the radio connection between the eNB 2 and the UE 3 is established on the cell 20 (RRC Connection Establishment).

In Step S908, the eNB 1 sends, to the UE 3 on the first cell 10, a message indicating activation of the cell 20 (i.e., use initiation) in order to initiate carrier aggregation (Secondary Cell Activation). In Step S909, the eNB 1 notifies the eNB 1 of completion of configuration of the cell 20, i.e., configuration of the secondary cell for carrier aggregation (Secondary Cell Configuration Complete). By completion of Step S909, the UE 3 can perform carrier aggregation of the cells 10 and 20. Accordingly, in Step S910, for example, the UE 3 receives downlink data at each of the cells 10 and 20.

Fourth Exemplary Procedure

The processes in Steps S901 to S905 in FIG. 14 are similar to those in Steps S901 to S905 in FIG. 13. In Step S1006, the eNB 1 instructs, at the serving cell (serving cell) 10, the UE 3 to receive information of the second cell 20 (Radio Resource Configuration of Second Cell). In Step S1007, the eNB 1 instructs the eNB 2 to establish the second radio connection on the cell 20 with the UE 3 (Secondary Cell Preparation Complete). In Step S1008, the eNB 2 instructs the UE 3 to establish the second radio connection on the cell 20 (RRC connection Reconfiguration).

In Step S1009, the UE 3 configures the cell 20 based on the instruction from the eNB 2. Thus, the radio connection between the eNB 2 and the UE 3 is established on the cell 20 (RRC Connection Establishment). In Step S1010, the eNB 2 notifies the eNB 1 of completion of second radio connection establishment (Secondary Cell Configuration Complete). By completion of Step S1010, the UE 3 can perform carrier aggregation of the cells 10 and 20. Accordingly, in Step S1011, for example, the UE 3 receives downlink data at each of the cells 10 and 20.

Third Embodiment

In the present embodiment, a modification of the second embodiment will be described. In the present embodiment, a description will be given of bearers between the radio stations 1 and 2 and the upper network, and setup of the bearers in the upper network. In order to transfer user data, the bearers are associated with the first and second radio connections (i.e., data radio bearers (Evolved Packet System Radio bearers: EPS RBs)) on the cells 10 and 20, which are configured by the procedures described in the second embodiment.

In an LTE system, an S1 bearer is used for transferring user data between the radio station (eNB) 1 or 2 and the upper network (Evolved Packet Core: EPC). An S1 bearer is established between a data transferring apparatus (i.e., Serving GW: S-GW) in the upper network and an eNB. Further, in an LTE system, an S5/S8 bearer is established between two data transferring apparatuses in the EPC, i.e., the S-GW and the P-GW (Packet Data Network Gateway). An EPS RB and an S1 bearer are collectively referred to as a radio access bearer (E-UTRAN Radio Access Bearer: E-RAB). An E-RAB is used for transferring user data between a UE and an EPC via an eNB. Further, bearers between a P-GW and a UE including an E-RAB and an S5/S8 bearer are referred to as an EPS bearer. An EPS bearer is set up for each UE. Further, a single UE can use a plurality of EPS bearers. In this case, EPS bearers associated with a single UE is differentiated from each other, for example, by their QoS classes of user data that they transfer.

Setup of an EPS bearer, an E-RAB, and an S1 bearer is controlled by a mobility management apparatus (Mobility Management Entity: MME) in the upper network. With regard to an S1 bearer, the MME communicates with an S-GW and with an eNB to share bearer context (e.g., the IP addresses of the S-GW and the eNB, and the end point identifiers of the S-GW and the eNB) among the MME, the S-GW and the eNB, and, consequently, the S1 bearer is established.

Figure 15:
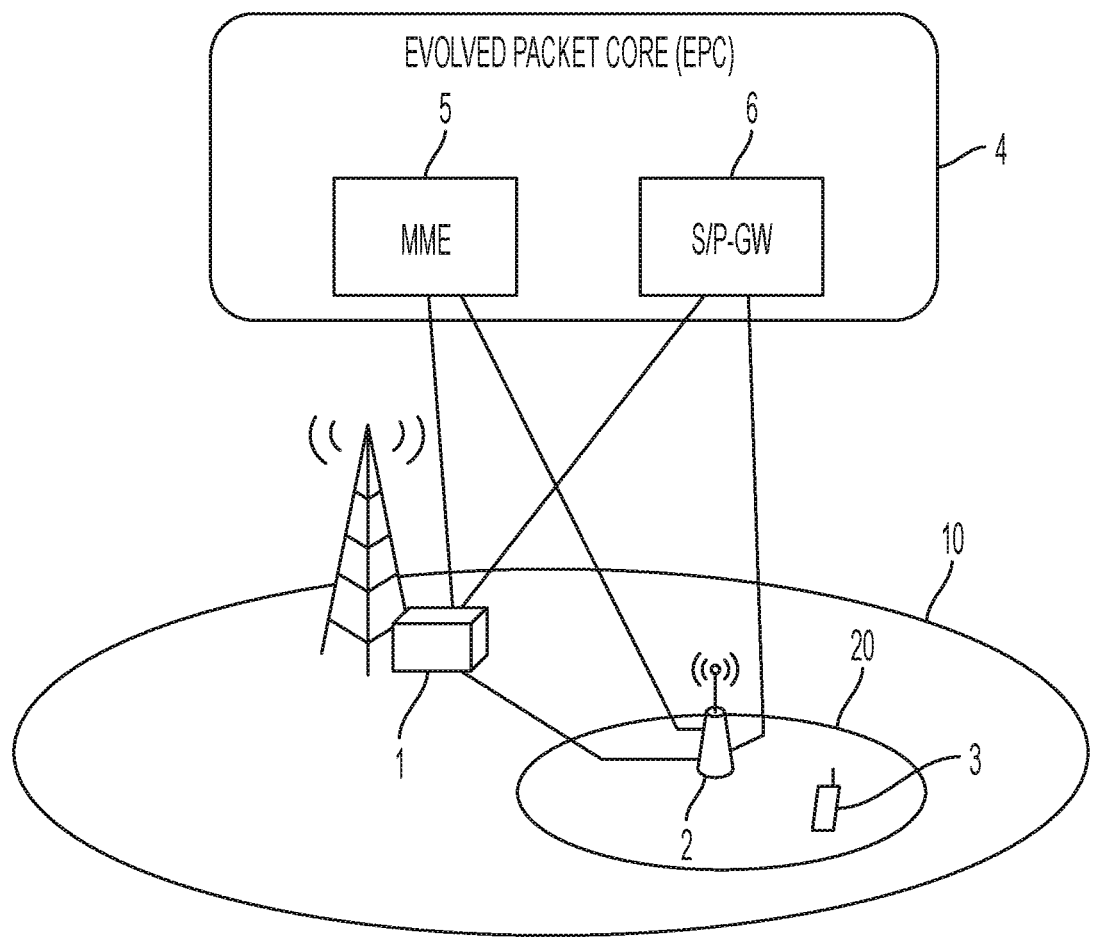
FIG. 15 is a diagram showing a configuration example of a radio communication system according to a third embodiment.

FIG. 15 is a block diagram showing a configuration example of the radio communication system according to the present embodiment. The EPC 4, as the specific example of the upper network, includes an MME 5 and an S/P-GW 6. The eNBs 1 and 2 each establish a control connection with the MME 5 (S1-MME) and a bearer (S1 bearer) associated with the S/P-GW 6 for transferring user data.

Figure 16:
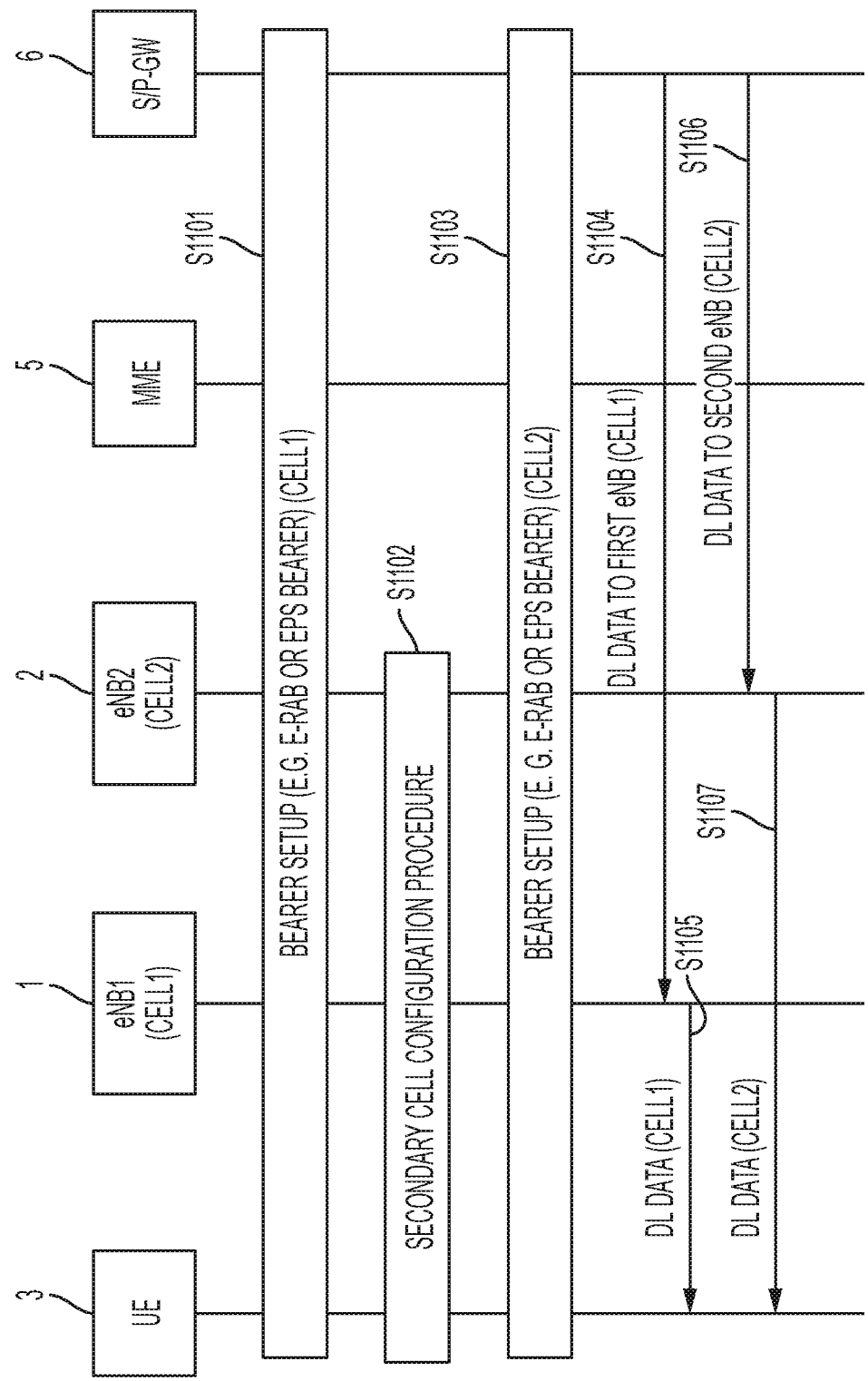
FIG. 16 is a sequence diagram showing an example of a communication control method in the radio communication system according to the third embodiment.
Figure 17:
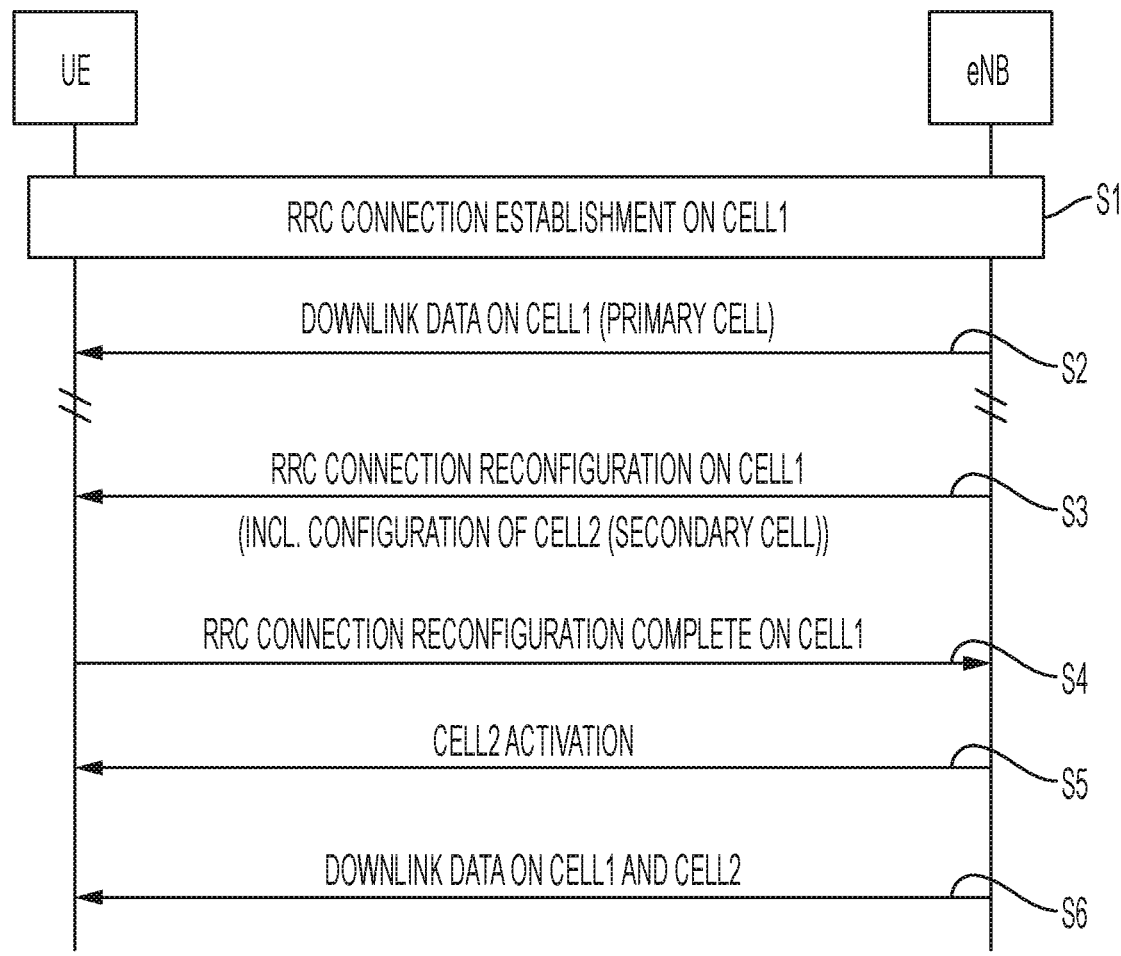
FIG. 17 is a sequence diagram showing a carrier aggregation procedure in LTE (Background Art).

Next, a setup procedure of an S1 bearer (or E-RAB, EPS bearer) according to the present embodiment will be described with reference to a sequence diagram of FIG. 16. Note that, in FIG. 16, the first cell 10 is represented as CELL1, and the second cell 20 is represented as CELL2. In Step 1101, by signaling of the UE 3, the eNB 1, the MME 5, and the S/P-GW 6, an EPS bearer for transferring user data between the UE 3 and the EPC 4 via the cell 10 is configured. In Step S1102, in order to enable the UE 3 to perform carrier aggregation of the cells 10 and 20 according to the procedure described in the second embodiment, the cell 20 is configured as the secondary cell. In Step S1103, the eNB 2 requests the MME 5 to set up a bearer (S1 bearer, E-RAB, or EPS bearer) for transferring user data between the UE 3 and the EPC 4 via the cell 20. Thus, by the signaling of the UE 3, the eNB 2, the MME 5, and the S/P-GW 6, the bearer setup procedure is executed. The eNB 2 sets up the S1 bearer (or the E-RAB) according to the bearer setup procedure. In Steps S1104 and S1106, the S/P-GW 6 transfers downlink user data destined for the UE 3 to the first S1 bearer that is associated with the eNB 1 or to the second S1 bearer associated with the eNB 2. In Steps S1105 and S1107, the eNBs 1 and 2 transmit to the UE 3 the downlink user data received via the S1 bearers.

Here, which one of the eNB 1 and 2 to be used for transmitting downlink user data may be determined, for example, based on the service type or required QoS (or QCI). Further, control-related signals (Control Plane (CP) signal) may be transmitted from the eNB 1, while user data-related signals (User Plane (UP) signal) may be transmitted from the eNB 2.

Note that, with regard to the third or fourth exemplary procedure described in the second embodiment, the example has been shown in which at least one of the selected network information and the bearer information of the UE 3 is sent from the eNB 1 to the eNB 2 in requesting (or instructing) preparation for communication with the UE 3 on the cell 20. The specific example of the selected network information is a GUMMEI, an eNB UE S1AP ID, an MME UE S1AP ID, a CSG ID, or any combination thereof. The specific example of the bearer information is an E-RAB ID, an E-RAB Level QoS Parameters, a UL GTP Tunnel Endpoint ID, or any combination thereof. One advantage of transferring at least one of the selected network information and the bearer information of the UE 3 to the eNB 2 is that, in the present embodiment, the eNB 2 can trigger the setup of the bearer for transferring, via the cell 20, user data of the UE 3. That is, the eNB 2 is only required to generate a bearer setup request based on at least one of the selected network information and the bearer information, and send the generated request to the MME 5. Thus, the present embodiment can greatly reduce the load of the UE 3 due to the bearer setup with different radio base stations.

Other Embodiments

In the second and third embodiments, the UE 3 may send control information (L1/L2 control information) of Layer 1 or Layer 2 using a physical uplink control channel (physical uplink control channel: PUCCH) on the secondary cell (cell 20). Specifically, the UE 3 may use a PUCCH of the secondary cell (cell 20) for replying a response (e.g., H-ARQ (Hybrid Automatic Repeat Request) ACK, CQI (Channel Quality Indicator)/PMI (Precoding Matrix Indicator), or RI (Rank Indicator)) to downlink reception on the secondary cell (cell 20).

Note that, in the normal CA in which a single eNB operates a plurality of cells, L1/L2 control information using a PUCCH is entirely transmitted on the primary cell. If architecture similar to the normal CA is employed in the Inter-eNB CA, interworking between the eNB 1 and the eNB 2 is required, and thus a process delay, an additional network load or the like would occur. In contrast, use of the physical uplink control channel of the secondary cell (cell 20) for a response to downlink reception on the secondary cell (cell 20) eliminates the necessity of interworking between the eNB 1 and the eNB 2.

In the second and third embodiments, the eNB 1 may transmit, for example, a random access preamble identifier (RA preamble ID), a mask value (RA PRACH Mask) used in a physical random access channel (Physical Random Access Channel: PRACH) to the eNB 2. Thus, an access delay in the uplink on the second cell can be reduced.

In the second and third embodiments, terminal identifiers (C-RNTI) of a radio link may be identical on the primary cell (cell 10) and the secondary cell (cell 20).

In the second and third embodiments, a Time Alignment (TA) Timer for determining synchronism of uplink signals (i.e., for managing synchronism) may be provided for each of the primary cell (cell 10) and the secondary cell (cell 20). Further, when there are a plurality of secondary cells, it is also possible to provide a single TA Timer to the plurality of secondary cells, to determine synchronism. Accordingly, the primary cell and the secondary cell (or the secondary cell group) may belong to different timing groups (Timing Advance Groups: TAGs).

In the second and third embodiments, the eNB 2 may send MIB (Master Information Block)/SIB (System Information Block) information and a security context to the eNB 1. Thus, the UE 3 can smoothly configure the secondary cell (cell 20).

In the first to third embodiments, the secondary cell (cell 20), which is added for carrier aggregation, may be used for only the downlink component carrier (Component Carrier: CC) or for only the uplink component carrier (CC).

In the first to third embodiments, the primary cell (cell 10) and the secondary cell (cell 20) may be in different duplex modes. For example, the primary cell (cell 10) may be in FDD (Frequency Division Duplex) while the secondary cell (cell 20) may be in TDD (Time Division Duplex).

The drawings referred to in the first to third embodiments show the heterogeneous network (HetNet) environment. However, such embodiments are applicable also to a homogenous network (Homogeneous Network). Example of the Homogeneous Network may be a cellular network formed by macro (or micro) cells operated by macro (or micro) base stations.

The communication control methods performed by the radio station 1 (communication control unit 15), the radio station 2 (communication control unit 25), and the radio terminal 3 (communication control unit 35) described in the first to third embodiments each may be implemented by using a semiconductor processing device including an Application Specific Integrated Circuit (ASIC)). Alternatively, these processes each may be implemented by causing a computer system including at least one processor (e.g., a microprocessor, a Micro Processing Unit (MPU) or a Digital Signal Processor (DSP)) to execute a program. More specifically, one or more programs including instructions for causing a computer system to perform the algorithms explained with reference to the flowcharts and sequence diagrams may be created and supplied to a computer system.

This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, in the first to third embodiments, the description has been given mainly of the LTE system. However, these embodiments may be applied also to a radio communication system other than the LTE system, e.g., a 3GPP UMTS (Universal Mobile Telecommunications System), a 3GPP2 CDMA2000 system (1×RTT, HRPD (High Rate Packet Data)), a GSM (Global System for Mobile Communications) system, a WiMAX system or the like.

Furthermore, the embodiments stated above are merely examples of application of the technical ideas obtained by the present inventor. Needless to say, these technical ideas are not limited to those described in the above embodiments and may be changed in various ways.

This application is based upon and claims the benefit of priority from Japanese Patent Application No. 2012-223177 filed on Oct. 5, 2012, and the disclosure of which is incorporated herein in its entirety by reference.

REFERENCE SIGNS LIST

1 FIRST RADIO STATION
2 SECOND RADIO STATION
3 RADIO TERMINAL
10 FIRST CELL
20 SECOND CELL
15 COMMUNICATION CONTROL UNIT
25 COMMUNICATION CONTROL UNIT
35 COMMUNICATION CONTROL UNIT

The invention claimed is:

1. A radio terminal comprising:
a transceiver; and
at least one processor configured to:
    establish a first Data Radio Bearer (DRB) with a first base station and a second DRB with a second base station while an established Signaling Radio Bearer (SRB) between the radio terminal and the first base station is maintained; and
    control the transceiver to receive, radio resource configuration information, from the second base station via the first base station, wherein
the radio resource configuration information includes both of a DRB identity that identifies the second DRB and an Evolved Packet System (EPS) bearer identity that identifies an EPS bearer, associated with the second DRB, the EPS bearer is a bearer between the radio terminal and a Packet Data Network Gateway (P-GW) through the second base station, and
the at least one processor is further configured to establish the second DRB that is indicated by the DRB identity and associated with the EPS bearer.

2. The radio terminal according to claim 1, wherein
the radio resource configuration information includes configuration information of a second cell operated by the second base station, and
the at least one processor is further configured to:
    add the second cell as a secondary cell based on the configuration information of the second cell, and
    perform aggregating a first cell, operated by the first base station, as a primary cell with the second cell as the secondary cell.

3. A first base station comprising:
a transceiver configured to communicate with a radio terminal; and
at least one processor configured to:
    establish a Signaling Radio Bearer (SRB) with the radio terminal,
    receive, from a second base station, radio resource configuration information, and
    transmit, via the transceiver to the radio terminal, the radio resource configuration information, wherein
a first Data Radio Bearer (DRB) is established between the first base station and the radio terminal,
a second DRB is established between the second base station and the radio terminal while an established SRB between the radio terminal and the first base station is maintained,
the radio resource configuration information includes both of a DRB identity that identifies the second DRB and an Evolved Packet System (EPS) bearer identity that identifies an EPS bearer, associated with the second DRB, the EPS bearer is a bearer between the radio terminal and a Packet Data Network Gateway (P-GW) through the second base station, and
the second DRB that is indicated by the DRB identity and associated with the EPS bearer is established by the radio terminal.

4. The first base station according to claim 3, wherein
the radio resource configuration information includes configuration information of a second cell operated by the second base station, and the radio resource configuration information of the second
cell causes the radio terminal to:
   add the second cell as a secondary cell based on the
configuration information of the second cell while
the SRB is maintained; and
   perform aggregating a first cell operated by the first
base station as a primary cell with the second cell as
the secondary cell.

5. A second base station, comprising:
a transceiver configured to communicate with a radio
terminal; and
at least one processor configured to:
   transmit a radio resource configuration information to a
radio terminal via the transceiver, wherein
a first Data Radio Bearer, DRB, is established between a
first base station and the radio terminal,
a second DRB is established between the second base
station and the radio terminal while an established SRB
between the radio terminal and the first base station is
maintained,
the radio resource configuration information includes
both of a DRB identity that identifies the second DRB
and an Evolved Packet System (EPS) bearer identity
that identifies an EPS bearer, associated with the second DRB, the EPS bearer is a bearer between the radio
terminal and a Packet Data Network Gateway (P-GW)
through the second base station, and causes the radio
terminal to configure the second DRB that is identified
by the DRB identity and associated with the EPS
bearer.

6. The second base station according to claim 5, wherein
the radio resource configuration information includes configuration information of a second cell operated by the
second base station,
the radio resource configuration information of the second
cell causes the radio terminal to:
   add the second cell as a secondary cell based on the
configuration information of the second cell while
the SRB is maintained; and
   perform aggregating a first cell operated by the first
base station as a primary cell with the second cell as
the secondary cell.

7. A radio communication system, comprising:
a first base station;
a second base station; and
a radio terminal, wherein
the radio terminal is configured to establish a first Data
Radio Bearer (DRB) with the first base station and a
second DRB with the second base station while an
established Signaling Radio Bearer (SRB) between the
radio terminal and the first base station is maintained,
and
the first base station is configured to establish a Signaling
Radio Bearer (SRB) between the radio terminal and the
first base station,
the second base station is configured to transmit a radio
resource configuration information to the first base
station,
the first base station is further configured to transmit the
radio resource configuration information to the radio
terminal,
the radio resource configuration information includes
both of a DRB identity that identifies the second DRB
and an Evolved Packet System (EPS) bearer identity
that identifies an EPS bearer, associated with the second DRB, the EPS bearer is a bearer between the radio
terminal and a Packet Data Network Gateway (P-GW)
through the second base station, and
the radio terminal is further configured to establish the
second DRB that is indicated by the DRB identity and
associated with the EPS bearer.

8. A method in a radio terminal, the method comprising:
establishing a first Data Radio Bearer (DRB) with a first
base station and a second DRB with a second base
station while an established Signaling Radio Bearer
(SRB) between the radio terminal and the first base
station is maintained; and
receiving, radio resource configuration information, from
the second base station via the first base station,
wherein the radio resource configuration information
includes both of a DRB identity that identifies the
second DRB and an Evolved Packet System (EPS)
bearer identity that identifies an EPS bearer, associated
with the second DRB, the EPS bearer is a bearer
between the radio terminal and a Packet Data Network
Gateway (P-GW) through the second base station, and
the establishing includes establishing the second DRB
that is indicated by the DRB identity and associated
with the EPS bearer.

9. A method in a first base station, the method comprising:
establishing a Signaling Radio Bearer (SRB) with a radio
terminal;
receiving, from the second base station, radio resource
configuration information; and
transmitting, to the radio terminal, the radio resource
configuration information, wherein
a first Data Radio Bearer (DRB) is established between
the first base station and the radio terminal,
a second DRB is established between the second base
station and the radio terminal while an established SRB
between the radio terminal and the first base station is
maintained,
the radio resource configuration information includes
both of a DRB identity that identifies the second DRB
and an Evolved Packet System (EPS) bearer identity
that identifies an EPS bearer, associated with the second DRB, the EPS bearer is a bearer between the radio
terminal and a Packet Data Network Gateway (P-GW)
through the second base station, and
the second DRB that is indicated by the DRB identity and
associated with the EPS bearer is established by the
radio terminal.

10. A method in a second base station, the method
comprising:
transmitting a radio resource configuration information to
a radio terminal, wherein
a first Data Radio Bearer (DRB) is established between a
first base station and the radio terminal,
a second DRB is established between the second base
station and the radio terminal while an established SRB
between the radio terminal and the first base station is
maintained,
the radio resource configuration information includes
both of a DRB identity that identifies the second DRB
and an Evolved Packet System (EPS) bearer identity
that identifies an EPS bearer, associated with the second DRB, the EPS bearer is a bearer between the radio
terminal and a Packet Data Network Gateway (P-GW)
through the second base station, and causes the radio
terminal to configure the second DRB that is identified
by the DRB identity and associated with the EPS
bearer.

* * * * *